C. H. HOWARD.
PAPER REINFORCING MACHINE.
APPLICATION FILED DEC. 1, 1916.

1,316,241. Patented Sept. 16, 1919.
13 SHEETS—SHEET 1.

Inventor
Charles H. Howard,
By Robt. P. Hains
Attorney

C. H. HOWARD.
PAPER REINFORCING MACHINE.
APPLICATION FILED DEC. 1, 1916.

1,316,241.

Patented Sept. 16, 1919.
13 SHEETS—SHEET 4.

Inventor
Charles H. Howard,
By Robt. P. Hains
Attorney

C. H. HOWARD.
PAPER REINFORCING MACHINE.
APPLICATION FILED DEC. 1, 1916.

1,316,241.

Patented Sept. 16, 1919.
13 SHEETS—SHEET 5.

Inventor
Charles H. Howard,
By Robt. P. Harris.
Attorney

C. H. HOWARD.
PAPER REINFORCING MACHINE.
APPLICATION FILED DEC. 1, 1916.
1,316,241.
Patented Sept. 16, 1919.
13 SHEETS—SHEET 7.
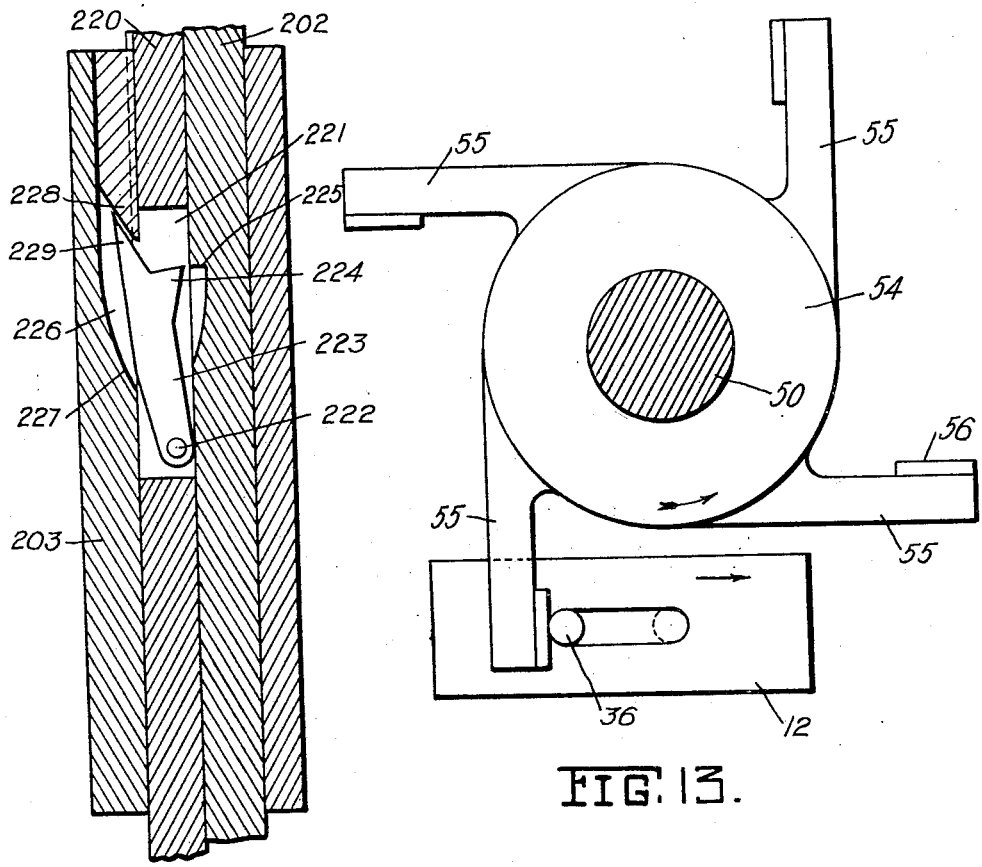
FIG. 13.
FIG. 12.
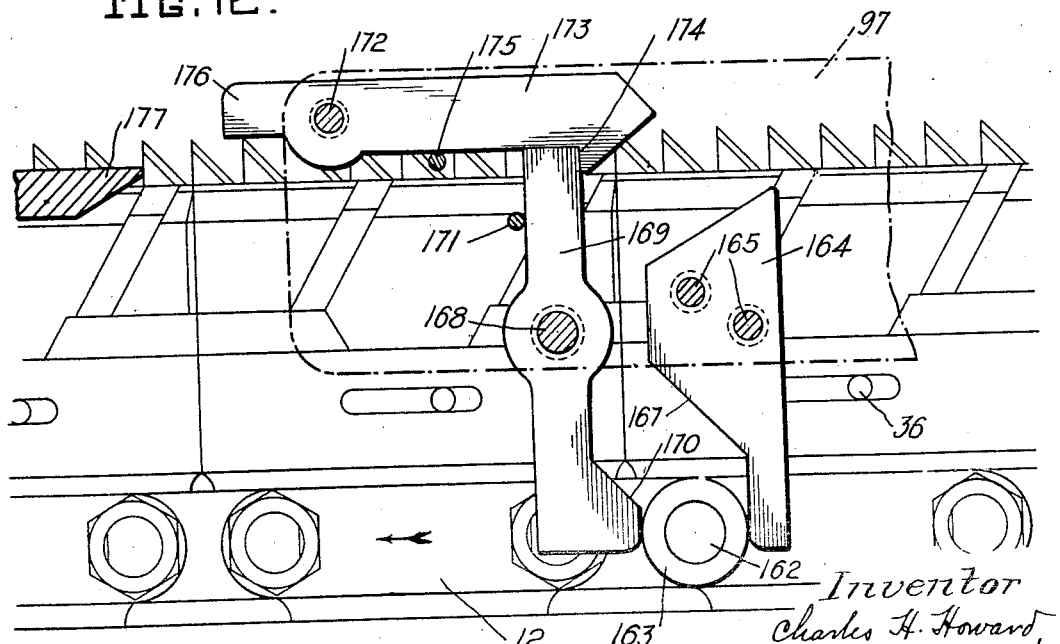
FIG. 11.

C. H. HOWARD.
PAPER REINFORCING MACHINE.
APPLICATION FILED DEC. 1, 1916.
1,316,241.
Patented Sept. 16, 1919.
13 SHEETS—SHEET 8.
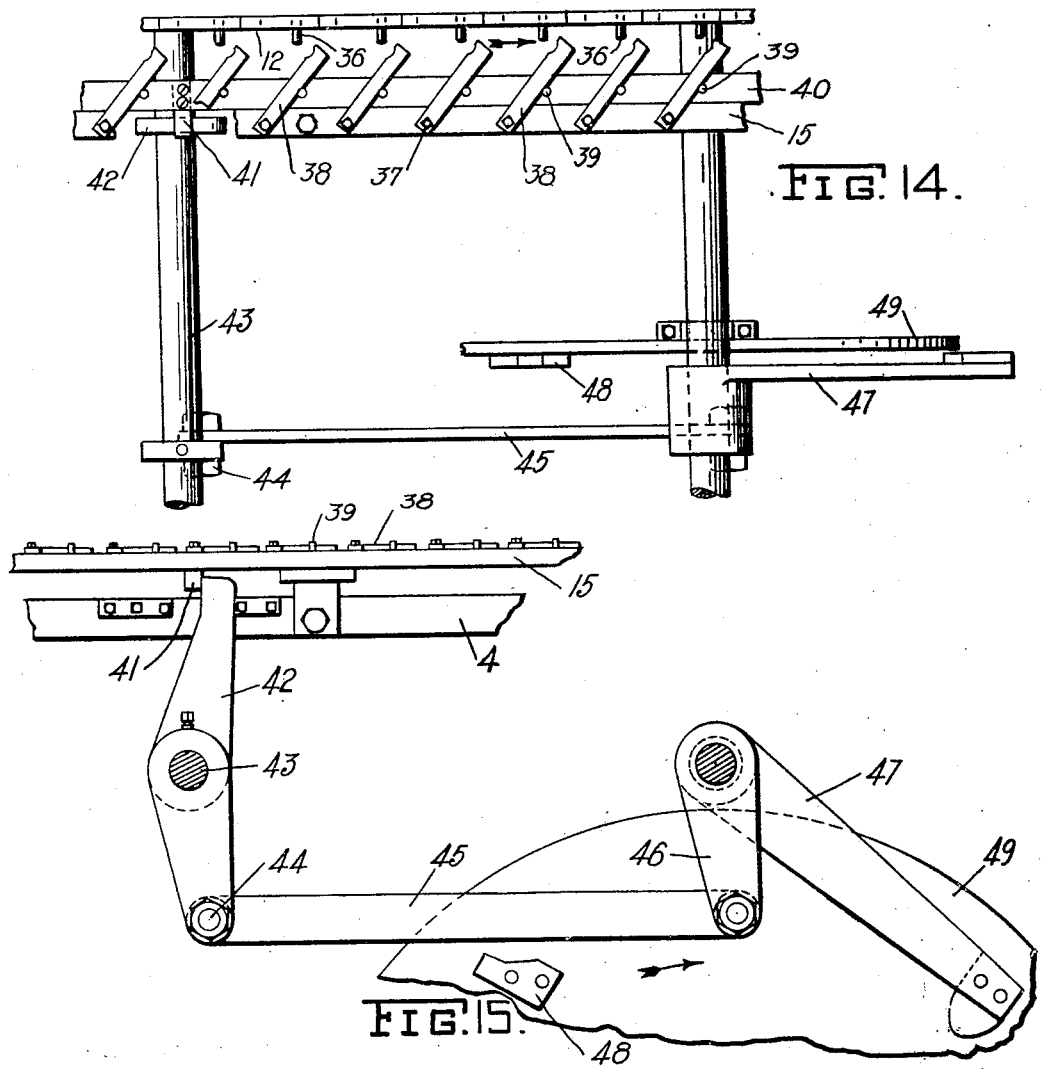
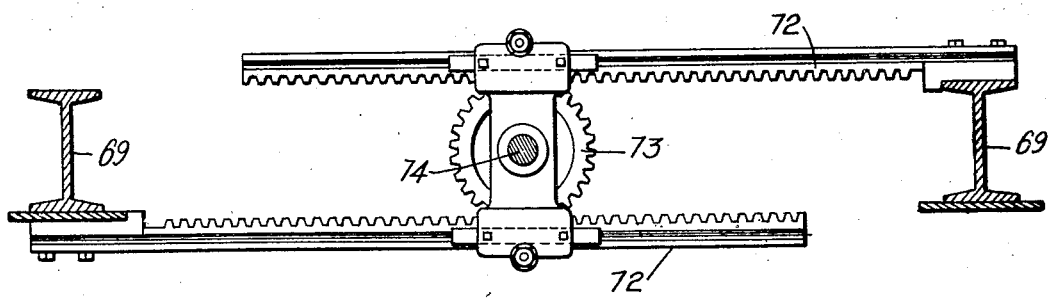
Inventor
Charles H. Howard,
By Robt. P. Hains.
Attorney C. H. HOWARD.
PAPER REINFORCING MACHINE.
APPLICATION FILED DEC. 1, 1916.
1,316,241.
Patented Sept. 16, 1919.
13 SHEETS—SHEET 9.
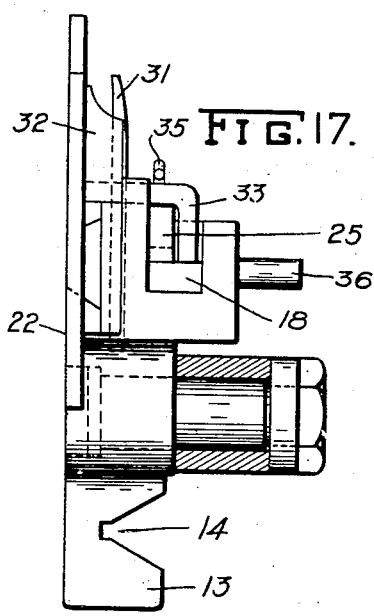
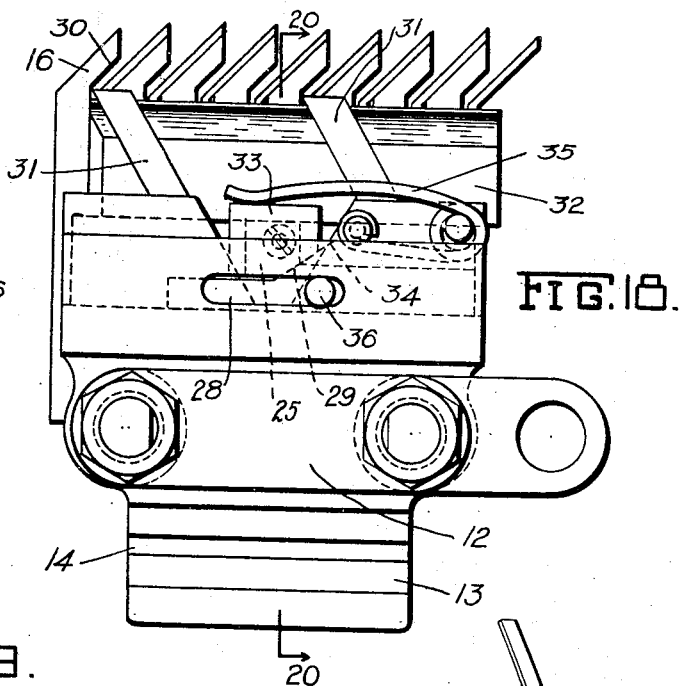
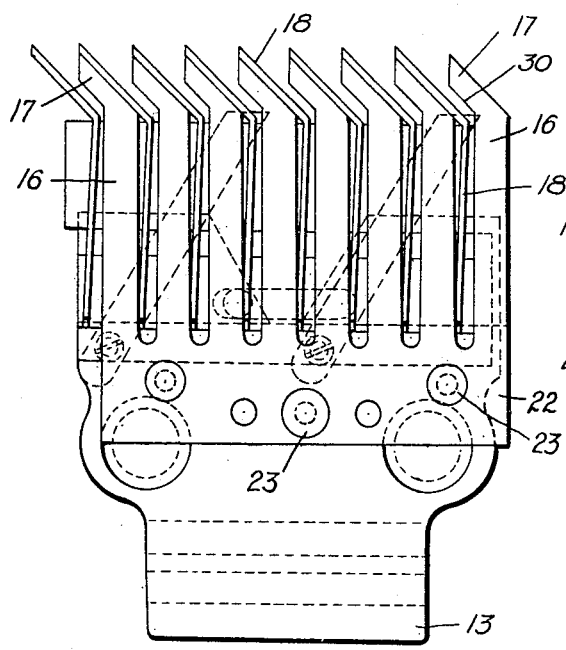
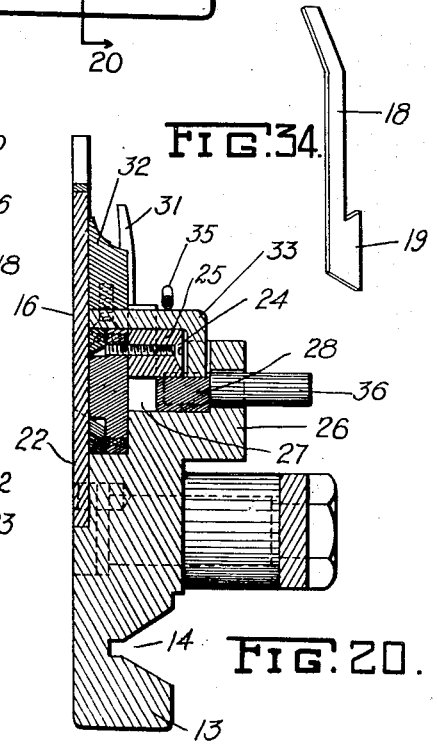
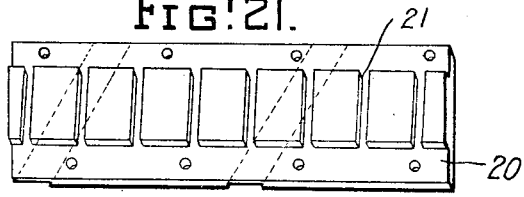
Inventor
Charles H. Howard,
By Robt. P. Hains,
Attorney

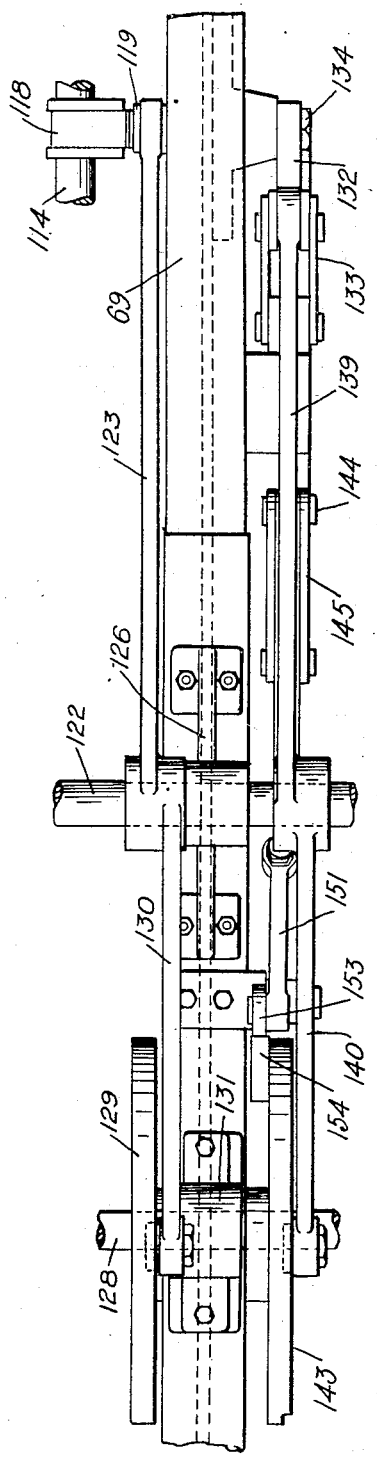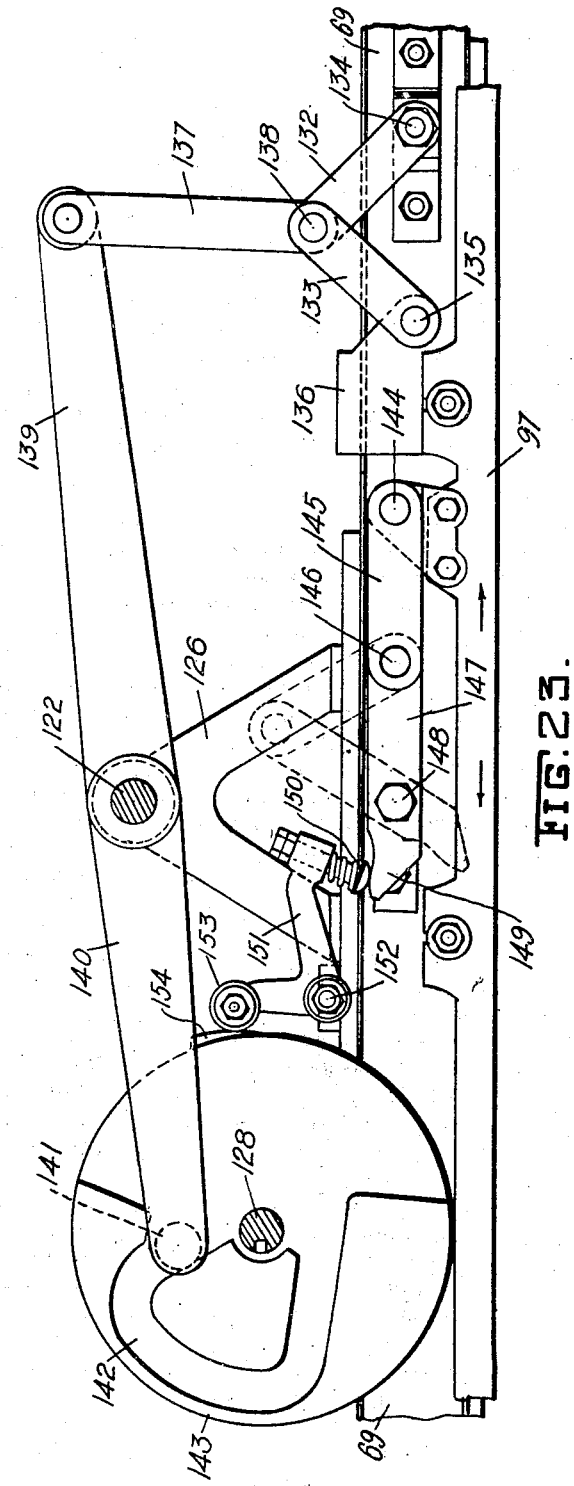

C. H. HOWARD.
PAPER REINFORCING MACHINE.
APPLICATION FILED DEC. 1, 1916.

1,316,241.

Patented Sept. 16, 1919.
13 SHEETS—SHEET 11.

Inventor
Charles H. Howard,
By Rob't P. Hains
Attorney

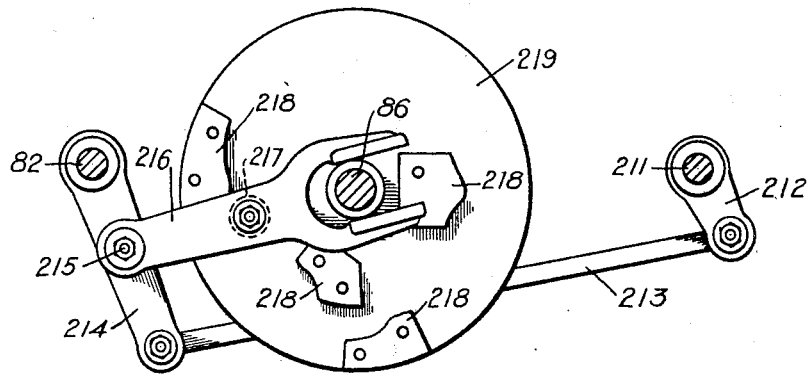
FIG. 26.
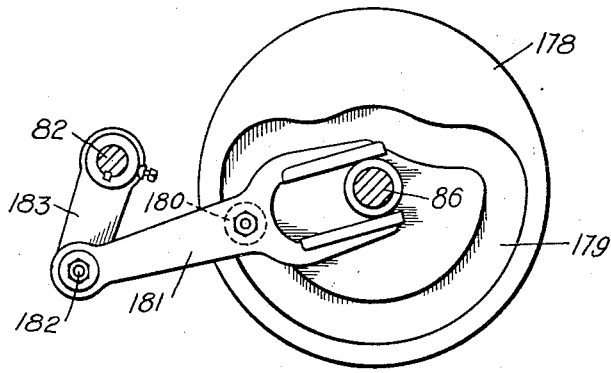
FIG. 27.
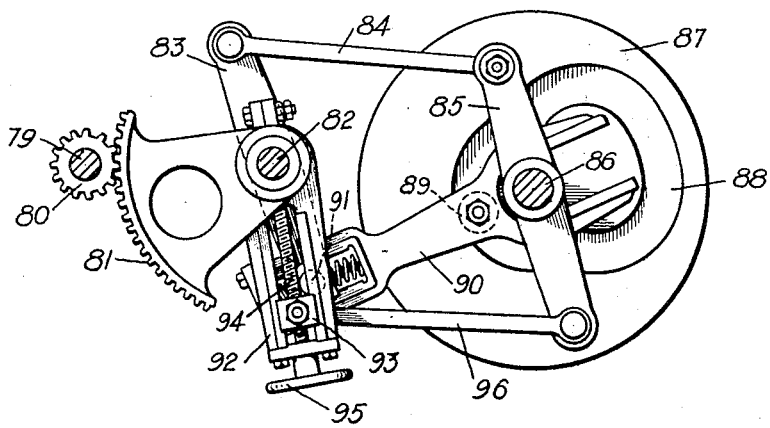
FIG. 28().

C. H. HOWARD.
PAPER REINFORCING MACHINE.
APPLICATION FILED DEC. 1, 1916.

1,316,241.

Patented Sept. 16, 1919.
13 SHEETS—SHEET 13.

Inventor:
Charles H. Howard,
by Robt. P. Haines
Attorney

UNITED STATES PATENT OFFICE.

CHARLES H. HOWARD, OF SAUGUS, MASSACHUSETTS, ASSIGNOR TO PAPER PRODUCTS MACHINE COMPANY, OF BOSTON, MASSACHUSETTS, A CORPORATION OF MASSACHUSETTS.

PAPER-REINFORCING MACHINE.

1,316,241.  Specification of Letters Patent.  Patented Sept. 16, 1919.

Application filed December 1, 1916. Serial No. 134,259.

*To all whom it may concern:*

Be it known that I, CHARLES H. HOWARD, a citizen of the United States, residing at Saugus, county of Essex, and State of Massachusetts, have invented an Improvement in Paper-Reinforcing Machines, of which the following description, in connection with the accompanying drawings, is a specification, like characters on the drawings representing like parts.

The invention to be hereinafter described relates to machines for reinforcing fabrics, and more particularly to such machines for reinforcing paper fabrics or paper stock by the introduction of transverse threads.

As well understood by those skilled in the art, the main difficulty encountered in reinforcing fabrics in the manner stated is the proper introduction and application of the reinforcing elements that extend transversely of the fabric to be reinforced. The reinforcing elements which may be threads, cords, wires, or similar filaments, should extend in substantially uniform relation transversely of the fabric until they are applied to or secured upon the surface of the fabric to be reinforced.

In some machines of this type, the reinforcing filaments are carried transversely of the machine or placed in transverse relation to the fabric to be reinforced, and are then freed from the means which has placed them in such transverse relation, so that when they are applied to the fabric they are liable to be curled up or rendered irregular in their transverse relation to the fabric.

An important feature of the present invention, therefore, consists in means for causing the transverse drawing or distending means and the receiver, whether it be the fabric itself or a carrier interposed between the fabric and drawing in means, to be relatively fixed so that the drawing in means and the receiver may for a time be prevented from relative movement while the reinforcing filaments have thus been transferred to the receiver. After the filaments have thus been transferred from the drawing means to the receiver, it is expedient that the threads be then freed from the drawing means to travel along with the receiver; and another important feature of the invention, therefore, consists in means for freeing the transverse filaments from the drawing in or distending means after they have been placed upon the receiver.

This feature of the invention, in the present form thereof, is carried into effect by forming the drawing in or distending means for transverse threads of a series of grippers which move transversely of the machine and then locking the grippers to the receiver during the time the threads are being transferred from the grippers to the receiver. The receiver in the present instance, consists of what may be conveniently termed a carrier, preferably one at each side of the machine, which take the transverse threads from the drawing in means or the grippers and carry them in a direction transversely to the movement of the grippers for delivery upon the fabric to be reinforced.

In order that the filaments which are thus taken by the carrier may be held by the carrier until they are secured upon the surface of the fabric, preferably by an adhesive, means are provided for freeing the transverse filaments from the carrier after they have been placed upon the fabric. It has heretofore been proposed to free the transverse filaments from the drawing in means when they are delivered to the receiver, whether it be the fabric itself or the carriers, and such means has comprised a cutting mechanism which acted upon the whole series of threads which have been previously placed in transverse position by the drawing in means. Another important feature of the present invention, therefore, consists of a cutting mechanism which moves longitudinally with the receiver and is actuated to cut only a portion of the whole number of transverse filaments that have been placed upon the receiver.

The drawing in means has heretofore been constructed to move transversely of the machine to take threads from the supply side of the machine and carry them to the path of movement of the fabric or paper to be reinforced, but the drawing in means is sometimes apt to vary in its final position of rest either to grasp the ends of the threads to be drawn transversely, or at its opposite position after drawing the threads transversely. Another important feature of the present invention, therefore, consists in means for positively determining the position of rest of the drawing in or distending means at either end of its transverse movements. This feature of the invention may be carried into effect by various mechanical devices, but in the present instance, locking means are employed for locking the drawing in or distending means or grippers at the end of their transverse movements.

In machines of this general type, the reinforcing filaments are often broken as they are drawn into their transverse position, and the machine in such case has to be stopped in order to introduce the broken filament to its proper position and insure that it be carried transversely with its companion threads. Another important feature, therefore, in the present invention, consists in means whereby, should one of the transverse reinforcing filaments become broken, it may be introduced to its proper relation with the other filaments without stopping the machine.

In addition to the transverse reinforcement of the fabric or paper, it is often desirable to introduce longitudinal reinforcing filaments. These, as in the case of the transverse filaments, are also liable at times to be broken as they are drawn from the source of supply. Such breakage, as in the case of the transverse filaments, usually necessitates that the machine be stopped in order to piece up or introduce the broken longitudinal threads into their proper relation with the fabric to be reinforced. Another important feature of the present invention, therefore, consists in means for piecing out the longitudinal threads, should they become broken at any time, without the necessity of stopping the machine.

The broad features of the invention, hereinbefore referred to, may be carried into effect by various detailed forms of mechanical devices, one good embodiment of which is illustrated in the accompanying drawings. These features of the invention, together with others, will best be understood from the following description and accompanying drawings for carrying the invention into practical effect, it being understood that the invention is not necessarily restricted to the details thereof, but may be varied within the true scope of the invention as pointed out by the claims.

In the drawings:

Fig. 11 is a view of the locking means as the parts thereof are bought into locking relation;

Fig. 12 is a sectional detail showing one form of means for preventing the gripper carrier locking means from becoming unlocked as the gripper carriers are raised and lowered;

Fig. 13 is an enlarged view showing the means for releasing the filaments from the carriers as they successively deliver their filaments to the fabric or paper being reinforced;

Fig. 14 is a detail in plan view showing a good, practical form of means for causing the carrier to engage and hold the transverse filaments when delivered thereto by the drawing in means;

Fig. 15 is a partial side elevation of the parts shown in Fig. 14, illustrating the means for moving the holding fingers;

Fig. 16 is a detail side elevation showing the rack and pinion means for moving the drawing in means transversely;

Fig. 17 is an end elevation, partly in section, showing one of the links of the carrier and its connected parts;

Fig. 18 is a side view of one of the links of the links of the carrier and its associated parts;

Fig. 19 is a view similar to that of Fig. 18, on the opposite side of the link;

Fig. 20 is a section on the line 20—20, Fig. 18;

Fig. 21 is a detached detail showing a part of the link of the carrier;

Fig. 22 is a detail plan view on an enlarged scale, showing the cam actuated means for operating the grippers and moving the grippers longitudinally with the receiver or carrier during the time of transfer of the transverse threads;

Fig. 23 is a side elevation of the parts shown in Fig. 22;

Fig. 26 is an enlarged section on the line 26—26, Fig. 4, showing the cam and associated parts for locking the drawing in means or grippers at the end of their transverse movements;

Fig. 27 is a section on the line 27—27, Fig. 4, showing the cam means for raising and lowering the drawing in means or gripper carriers;

Fig. 28 is a section on the line 28—28, Fig. 4, showing the means for rocking the shaft for moving the gripper carriers transversely;

Fig. 34 is a section of one of the spring fingers.

Figure 1:
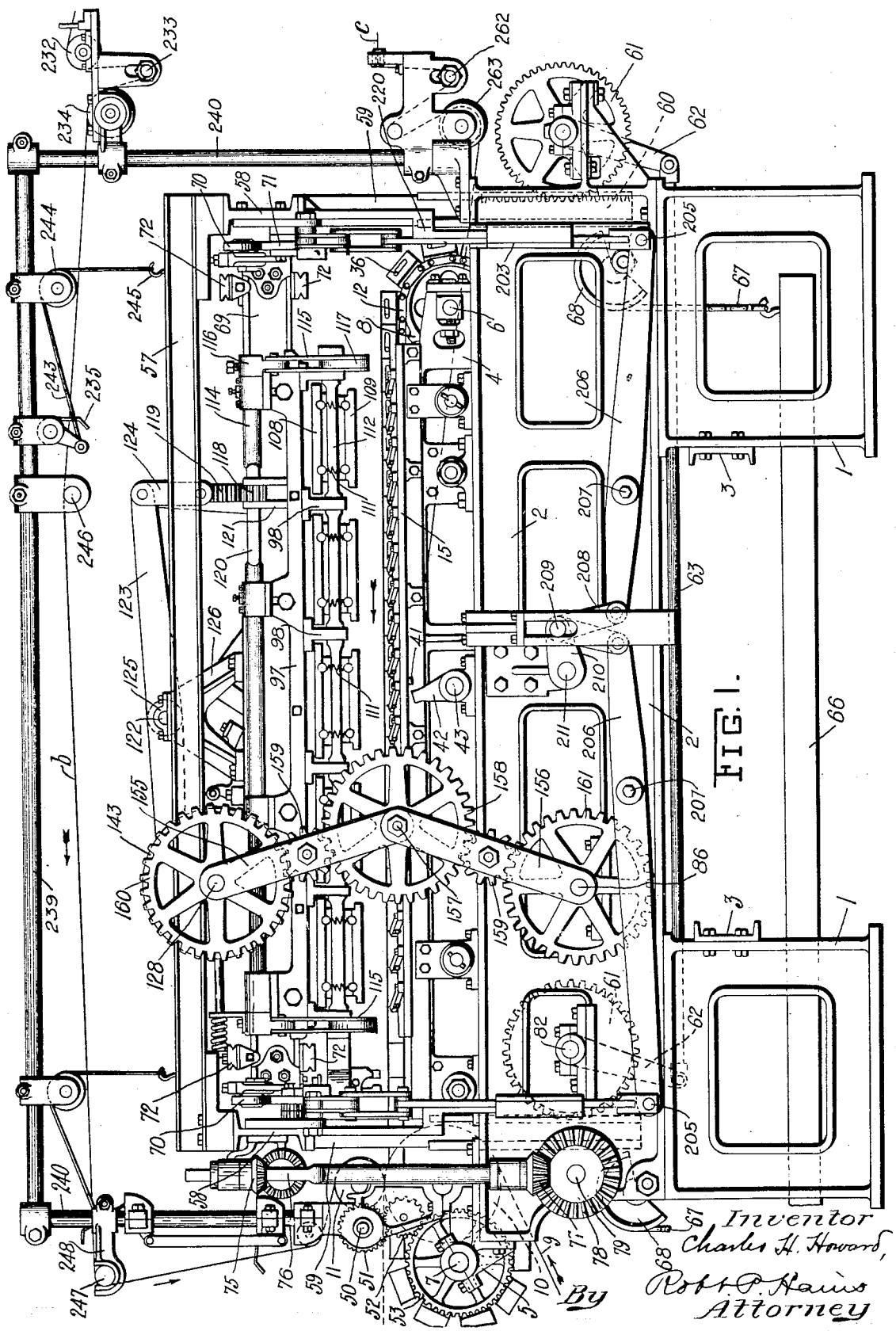
Figure 1 is a side elevation of one good, practical form of the machine embodying the present invention.
Figure 2:
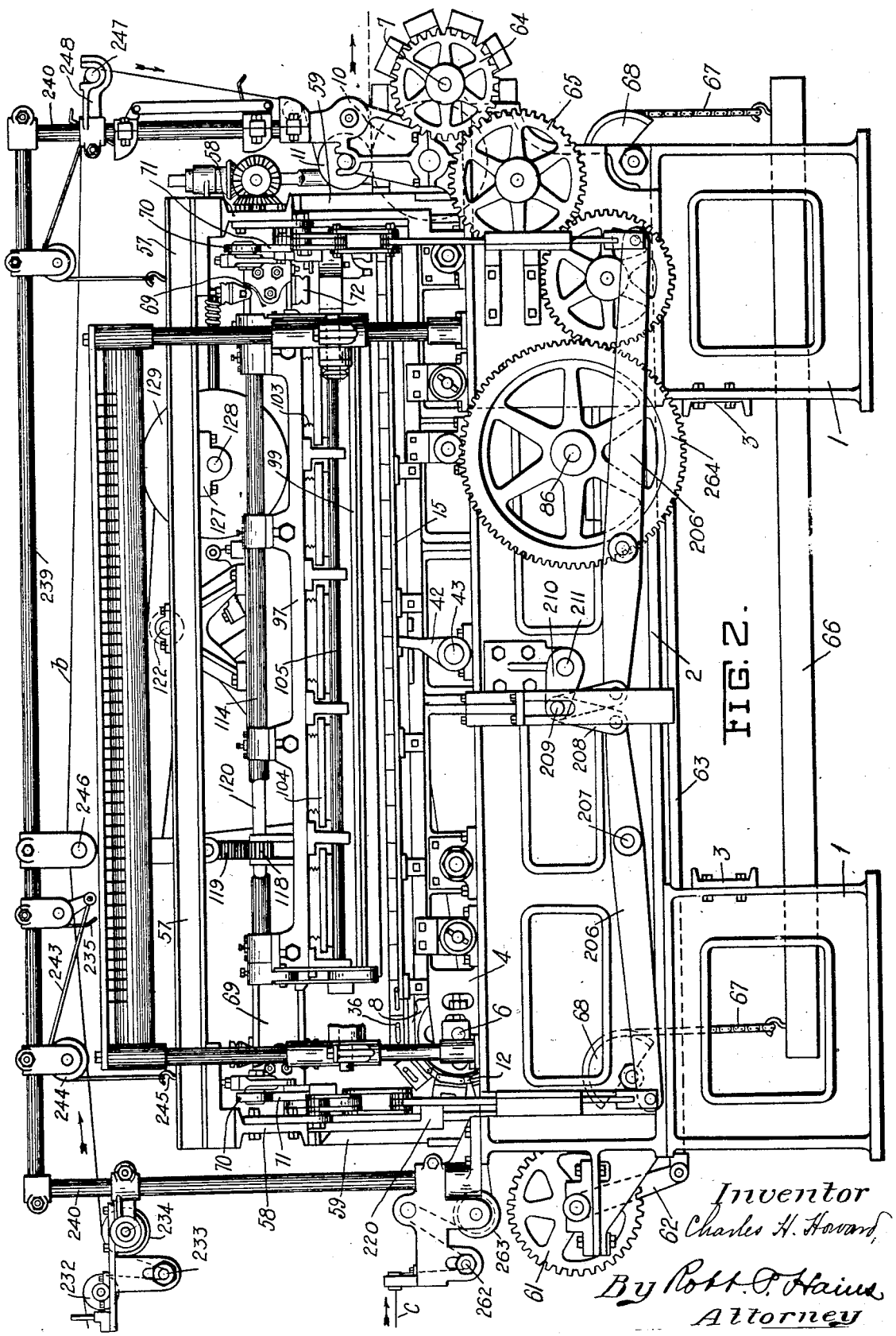
Fig. 2 is a similar side elevation at the opposite side of the machine.

The main supporting framework of the machine may be of any desired character suitable for sustaining the operating parts, and as illustrated in the drawings, consists of the base portions 1 surmounted by a suitable rigid box framing 2, the base portions 1 being suitably tied together as necessary, by cross ties 3, substantially as indicated in Figs. 1 and 2.

Mounted upon the main frame 2 are the brackets 4 and 5, one at either end or approximately at either end of the machine frame, carrying suitable bearings for the shafts 6 and 7, Figs. 1 and 2. Mounted on the shafts 6 and 7 are suitable guiding wheels or sprockets 8 about which the carrier, to be hereinafter more fully described, passes. Connected to one of the shafts 6 or 7, preferably the shaft 7, is a driving connection to any suitable source of power by which motion is transmitted to the various operating parts of the machine. The shaft 7 may, therefore, be termed the main driving shaft, Figs. 1 and 2. The fabric 9 to be reinforced, see Fig. 1, is drawn from any suitable source of supply, and passes about a guide wheel 10 beneath a guide and pressure roll 11, and the reinforcing filaments, in the illustrated form of the invention, are transferred to the fabric 9 by the carrier as the fabric passes about the guide roll 10.

The carrier for carrying the transverse threads to be delivered to the surface of the fabric to be reinforced, in the present instance, consists of a sprocket chain 12 which passes about the sprocket wheels 8 at either end of the machine, and each link of the carrier at either side of the machine, has connected thereto means for taking the transverse threads or filaments from the drawing in or distending means and holding them while the carrier moves them progressively toward the fabric for delivery thereto. In the present form of the invention, the links of the sprocket chain 12 each carry an extension 13, Figs. 17, 18, 19 and 20, having a grooved portion 14 which engages and travels along a support or guide 15, Fig. 1, the construction being such that as the links of the chain travel longitudinally of the machine between the sprocket wheels, hereinbefore described, it will be confined to a straight or rectilinear path and the links of the chain and the parts carried thereby will be prevented from sagging.

Extending upwardly from the links 12 of the sprocket chain, and secured thereto, are the fingers 16, Figs. 17 to 20, inclusive, which constitute one of the holding jaws for taking the reinforcing filaments or threads from the drawing in means and holding them while the carrier carries them for delivery to the material to be reinforced. These fingers 16 are preferably provided with inclined upper portions 17. Companion fingers or holding devices which coöperate with the fingers 16 to hold the reinforcing filaments or threads, in the present form of the invention, comprise the yielding members 18, one of which is shown in detail in Fig. 34. The yielding members 18 may be variously contrived, but in the present form of the invention, they are formed separately and each has an enlarged lower portion 19 adapted to be secured to a block 20 having slotted portions 21, Fig. 21, for the reception of the enlarged portions 19. Each of the links 12 of the sprocket chain may have a series of parts 16 and 18 which, for identification, may be known as the holders. In the present instance of the invention, there are eight of each of these members 16 and 18, and they are respectively movable, as will presently appear, for clamping and holding the transverse filaments as the latter are delivered thereto by the drawing in or distending means. The fingers 16 may be conveniently formed in a plate 22, Figs. 19 and 20, which may be secured to the chain links by suitable devices such as the bolts 23.

Projecting from the part 20 or secured thereto by means of a screw or other device 24, Fig. 20, is a lug 25, the construction being such that should the lug 25 be raised or lowered, it will cause the yielding members 18 of the holder to correspondingly rise or fall. The upper portion of each link of the sprocket chain has a side projecting arm 26, Fig. 20, provided with a guideway 27 in which is movable longitudinally a cam block 28 having an inclined portion 29 along one edge thereof adapted to engage a correspondingly inclined portion on the projection or lug 25 secured to the part 20 which carries the yielding members 18 of the holder, the construction being such that should the slide 28 be moved longitudinally of the link to the left, Fig. 18, it will correspondingly raise the lug 25 and perforce, raise the yielding members 18 into clamping relation with the inclined portions 17 of the fingers 16.

In order that the upward sliding movement of the part 20 with the yielding members 18 of the holder may be in a direction toward and from the surfaces 30 of the inclines 17, each link of the chain has connected thereto inclined guiding means such as the incline guides 31, Fig. 18, the construction being such that when the slide 28 is moved to the left, Fig. 18, the member 20 carrying the yielding members 18 of the holder will move upwardly in an inclined direction to clamp between them and the under surfaces 30 of the incline 17, the transverse reinforcing filaments.

Mounted on each link of one of the sprocket chains is a cutter 32 also guided in its upward and downward movement by the guides 31. Projecting from each of the cutters 32 is a block 33 which overhangs the lug 25 projecting from the part 20, and the lower edge portions of the block 33 rest upon the slide 28 near the outer edge thereof, as indicated in Fig. 20. The slide 28 has an incline portion 34 adapted to co-act with a similarly inclined portion on the right of the block 33, the construction being such that when the slide 28 is moved to the left, Fig. 18, it will cause the holders 16 and 18 to grasp and hold the filaments or threads, and further movement of the slide 28 will cause the cutter 32 to rise and cut the threads while held by the holders. A suitable means may be provided to cause the cutter and members 18 of the holder to assume their lowered or initial position when the slide 28 is moved back to its normal position, as indicated in Fig. 18. In the present instance, a spring 35 secured to each chain link, bears upon the block 33 to effect downward movement of both the cutter and the members 18 of the holder when the slide 28 is moved to its initial position as indicated in Fig. 18.

When the transverse reinforcing filaments are drawn into transverse relation with respect to the carrier or chains one at each side of the machine, the jaw members of the holders are open in the position indicated in Figs. 18 and 19, and, as will hereinafter be described, the drawing in means or grippers then descend to place the reinforcing filaments between the members 18 and 16 of the holders. When the parts are in this position, it is desirable that the members of the holder shall clamp the filaments or threads and that when clamped, the cutter shall perform its cutting operation to free the filaments or threads from the drawing means or grippers. To this end, each of the slides 28 carried by each link of the sprocket chain, has a projecting pin 36 which is adapted at times to engage devices to cause movement of the slide to the left, Fig. 18, relative to the link as the link or chain moves to carry the filaments or threads for delivery to the fabric to be reinforced. Pivotally mounted adjacent the carrier at each side of the machine on the support 15, Figs. 1, 2 and 14, as at 37, is a series of fingers 38 which normally rest in an incline position as indicated in Fig. 14, against the stop pins 39 carried by a slide 40. Projecting downwardly from the slide 40 is a lug 41 adapted to be engaged by the upper end of an arm 42 mounted for movement about an axis 43 and having connected thereto at 44, a link 45, Fig. 15, jointed to an arm 46 which may be actuated by a finger 47 by means of a cam lug 48 mounted upon the cam disk 49, the construction being such that when the filaments or threads have been placed in position between the members of the holder, the lug 48 of the cam 49 will rock the arm 42 to move the slide 40 to the left, Fig. 14, thereby turning the ends of the fingers 38 into the paths of movement of the pins 36 projecting from the slide 38 to thereby move the slide relatively to the links and cause the holders to grasp and hold the filaments or threads and the cutter to then rise and cut the filaments or threads from connection with the drawing in means and source of supply, whereupon the filaments will be carried by the carrier toward the fabric to be reinforced. As soon as the threads have been clamped and cut, the fingers 38, being no longer held in their actuating position by the cam, are moved to their inactive position.

In order that the filaments or threads may be deposited upon the surface of the fabric or paper while maintaining their transverse relation thereto, one aspect of the present invention contemplates that the filaments or threads carried by each link of the carrier shall first be placed upon the fabric as it passes about the guide 10 and that thereafter, that such filaments or threads shall be released from the holders of the carrier.

To this end, there is mounted in suitable brackets near the delivery end of the machine, at the left, Fig. 1, a shaft 50 which may be actuated by suitable gearing 51, 52 and 53, receiving motion from the driving shaft 7. Upon the shaft 50, see Fig. 13, is mounted a holder trip 54 which may be of suitable construction to operate upon the pins or projections 36 of the slides 28 after each link of the carrier or chain has deposited its filaments or threads in transverse relation upon the fabric to be reinforced. In the present instance of the invention, the trip comprises a hub portion from which project the arms 55 having facing pieces 56 which successively engage the ribs or projections 36 as the carrier links and the associated holders deliver the transverse filaments or threads to the surface of the fabric.

It is expedient at this time to describe the means for drawing the threads into transverse position for delivery to the carrier or a receiver, and to explain the construction and mode of operation thereof.

Mounted for vertical movement with respect to the main frame 2 is a frame which, for identification, will be noted as the drawing in or gripper frame, Figs. 1 and 2. This frame is of substantial construction and is composed of longitudinal members 57 and the transversely-extending members 58, Figs. 1 and 2, which are suitably tied together as indicated in the drawings, to form a substantial supporting framework. Extending downwardly from the drawing in or gripper frame, preferably at each corner portion thereof, are the supports 59, Figs. 1, 2 and 3, which may be appropriately formed of angle iron and provided at their lower portions with a series of rack teeth 60, Fig. 1, adapted to be engaged by the teeth of the operating gears 61 mounted in suitable bearings near the corner portions of the main frame 2, substantially as indicated in Figs. 1 and 2, the construction being such that upon rotation of the gears or the pinions 61, the supports 59 for the drawing in or gripper frames, will be raised and lowered. In order that this movement of the drawing in or gripper frame may be uniform at all portions, the pinions 61 have secured thereto the arms 62 which may be connected by suitable means such as the rods 63, whereby the pinions 61 may be caused to move in unison.

In order that appropriate movement may be imparted to the pinions 61, the drive shaft 7 has conected thereto at one end, the gear 64, Fig. 2, which meshes with a gear 65 which in turn, is in operative engagement with one of the gears 61, substantially as indicated in Fig. 2, the construction being such that rising and falling movements of the drawing in or gripper frame are delivered from the driving shaft through a train of mechanism.

In view of the weight of the drawing in or gripper frame, it is expedient to counterbalance the frame, and this is preferably done as indicated in Figs. 1 and 2 by a weight 66, which is connected by suitable means such as the chains 67, Figs. 1 and 2, with the supports 59 depending from the drawing in or gripper frame, said chains 67 between the supports and the weight 66 preferably passing over guides or segments 68, Figs. 1 and 2. By counterbalancing the drawing in or gripper frame in the manner stated, the action of the machine is rendered more even and its operation is carried into effect without shock.

The present invention contemplates that the drawing in means shall simultaneously draw from a supply of filaments at one side of the machine, a plurality of said filaments into transverse relation with the machine or the fabric to be reinforced. This may be effected by suitable drawing in means movable transversely of the machine, and while one such drawing in means movable transversely of the machine may be sufficient in many cases, in the present instance of the invention, the drawing in means is formed of two members, each of which moves toward the median line of the machine and then back again to the side thereof. This is the preferred construction, though not necessary in every instance.

Mounted for movement transversely of the drawing in or gripper frame, are the gripper carrier frames 69, Figs. 1, 2 and 16. These gripper carrying frames may be variously formed, but in the present instance of the invention comprise angle members as indicated in cross section in Fig. 6, from which project suitable carrying rollers 70 which travel upon guides 71 secured to the members 58 of the drawing in and gripper frame. Secured to each of the gripper carrying frames 69 is a rack member 72, Fig. 16, each of which engages an operating pinion 73 placed between them and mounted upon a shaft 74 extending longitudinally of the drawing in or gripper frame. This respect, that is, the movement of the gripper carrier frames toward and from the median line of the machine, may be constructed substantially in accordance with the like mechanical devices described in the prior patent to Howard, No. 1,211,852, dated January 9, 1917.

Figure 4:
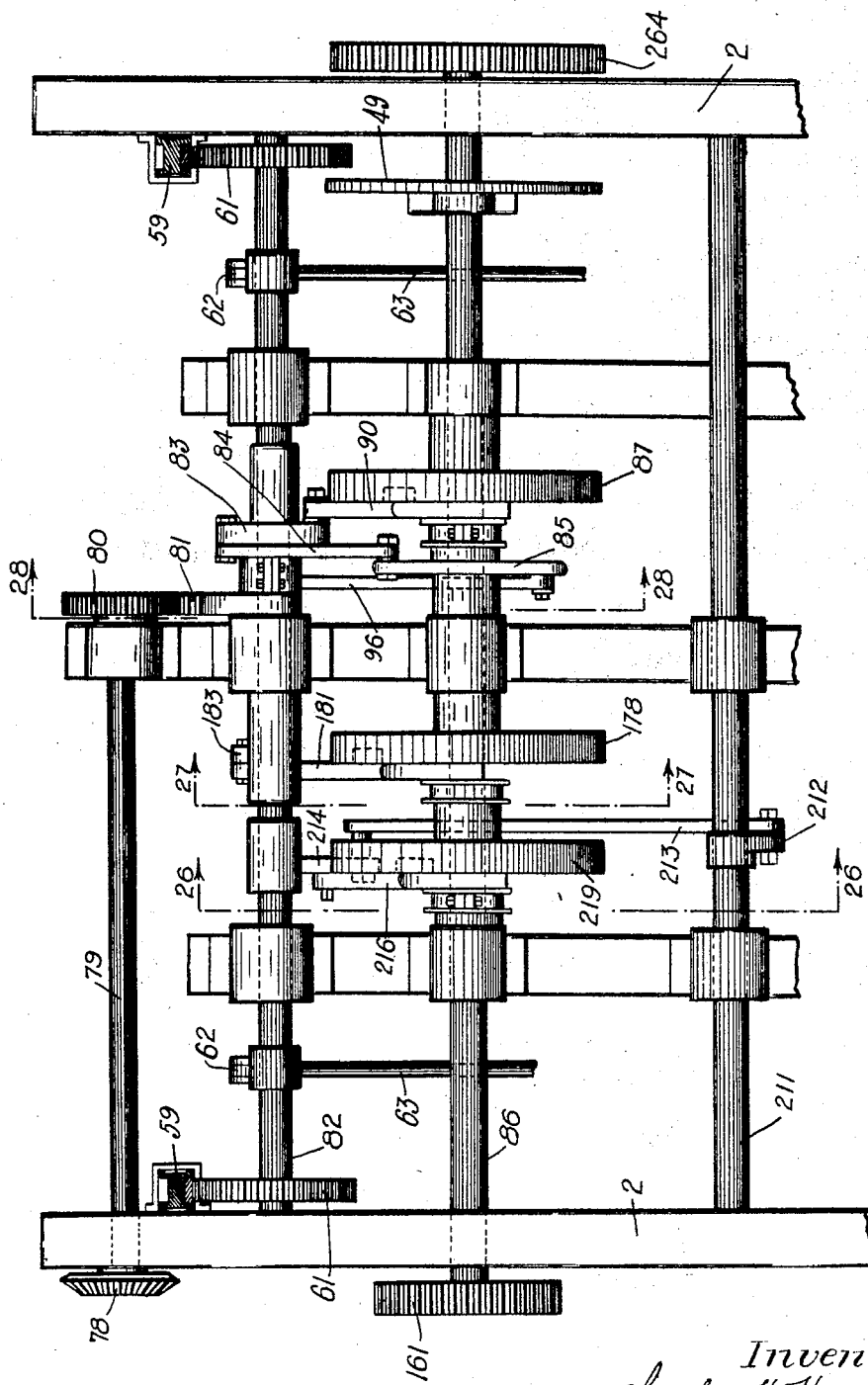
Fig. 4 is a sectional plan view showing the various cams and connected mechanisms for actuating the parts of the machine.

The means for operating the shaft carrying pinion 73 is best shown in Fig. 1, wherein the drawing-in or gripper frame has mounted for movement therewith, the bevel gear 75 which is splined upon the shafts 76, Fig. 1, the lower end of which carries the bevel gear 77 which is engaged by the bevel gear 78 mounted on the shaft 79. In order that the proper transverse movements may be imparted to the drawing-in or gripper devices, the shafts 79, and perforce, the connected parts, are given an oscillating or rocking movement first in one direction and then in the other. The means to this end may be variously contrived, but in the present instance of the invention, as shown by Figs. 4 and 28, the shaft 79 has secured thereto the pinion 80 which is operatively engaged with the segment rack 81 loosely mounted upon the shaft 82. Also loosely mounted upon the shaft 82 as indicated in Fig. 28, is the rocker arm 83, the upper end of which is connected by a link 84 to another rocker arm 85 loosely mounted upon the cam shaft 86. Secured to the cam shaft 86 is a cam 87 having the cam groove 88 which is engaged by a roll 89 projecting from the arm 90, the outer end portion of which is secured to the lower end of the rocker arm 83, as at 91. Secured to or formed as part of the rack segment 81 is a yoke 92 in which is adjustably mounted a block 93 by means of the screw 94 which may be appropriately operated by a hand wheel 95. Connecting the block 93 to the lower end of the rocker arm 85 is the link 96, the construction being such that upon rotation of the cam shaft 86 the cam operated arm 90 will rock the arm 83 which, by means of the links 84, the rocker 85 and link 96, will cause the rack segment 81 to oscillate or move first in one direction and then in the other to thereby rock the shaft 79, as will be hereinafter explained.

The drawing-in means which directly draw in the transverse threads, may be variously formed, but in the present invention is shown as comprising a series of grippers which are mounted upon a gripper carrier 97, Figs. 1 and 2. The gripper carrier 97 is of sufficient dimensions to carry a number of grippers as extended in Fig. 1, and is mounted for movement longitudinally of the gripper carrying frame 69. That is to say, the gripper carrier 97, the element which supports the grippers directly, is mounted for longitudinal movement upon the gripper carrying frames 69 and likewise moves with these frames 69 transversely of the machine.

The gripper carriers 97 may be variously formed and of different dimensions; but as illustrated in the present instance, they carry a series of five grippers between the downwardly-projecting portions 98 of the gripper carrier 97. The grippers comprise jaw members as represented in Figs. 5, 6, 7 and 8. The gripper jaw members on the gripper carrier at the supply side of the machine comprise the fixed lower jaw member 99, Fig. 7, having a jaw portion 100 which coöperates with an upper jaw member 101 pivoted at 102 and normally under the influence of a spring 103 tending to open the jaw members. Below the end 104 of the jaw members at the supply side of the machine and carried by the gripper carrier 97, is a rod 105 having a projection 106, the construction being such that when the rod 105 is rotated, the jaw member 101 will be opened and closed as will be evident from Fig. 7. The upper jaw member is preferably formed of a series of separate teeth 107 which may be substantially the same as those described in the prior application referred to, the construction being such that the jaw members at the supply side of the machine may operate simultaneously upon a number of filaments or threads of varying diameters.

Figure 5:
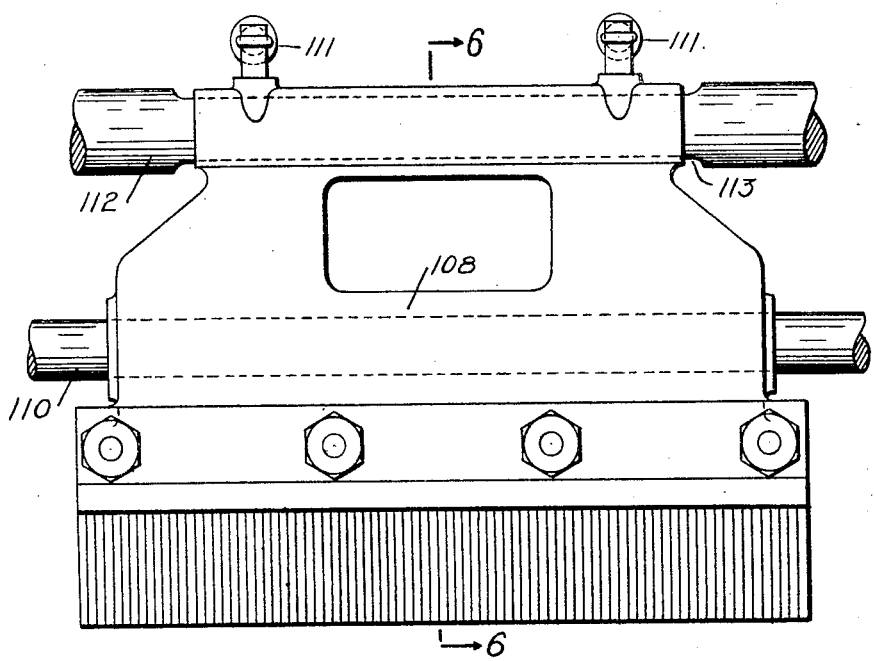
Fig. 5 is a detail view on an enlarged scale and in plan, showing one of the grippers.
Figure 6:
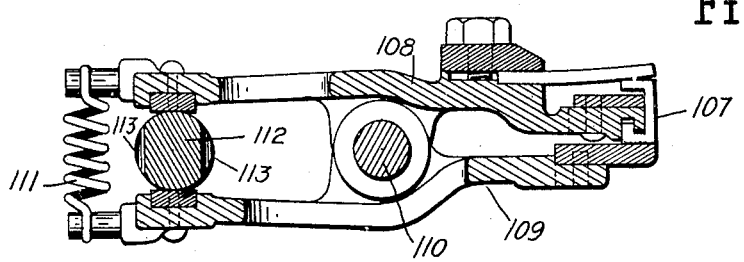
Fig. 6 is a section of Fig. 5, on the line 6—6.
Figure 7:
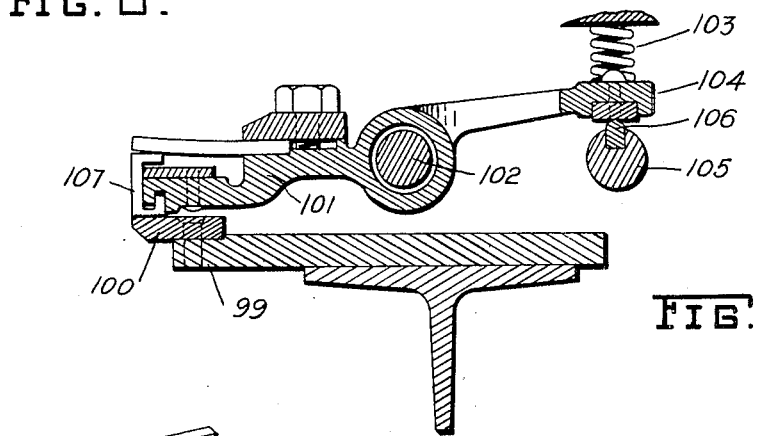
Fig. 7 is a section of one of the grippers at the supply side of the machine.
Figure 8:
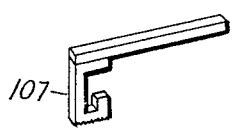
Fig. 8 is a detail showing one of the yielding toothed members of the grippers.

The grippers at the opposite side of the machine may be variously formed as indicated in Figs. 5 and 6, wherein the upper and lower jaw members 108 and 109 are pivotally mounted upon the rod 110 carried by the downwardly-projecting portions 98 of the gripper carrier 97, said jaw members being normally under the influence of a spring 111 to open the jaws. Between the jaw members adjacent the spring is a jaw-operating member 112 having the slabbed-off or cam portion 113 at the opposite sides thereof, the construction being such that by rotating the shaft 112, the jaw members 108 and 109 may be appropriately opened and closed, substantially as described in the former application. One of the jaw members at this side of the machine may be provided with individual yielding teeth 107 such as described for the grippers at the supply side of the machine, or substantially like those in the prior application.

In order to operate the jaw closing rods, as for instance 112, the gripper carrier 97 has mounted thereon a rock shaft 114, Fig. 1, from which extend the links 115 secured to the end of the shaft 112 as indicated in Fig. 1. These links 115 may be connected to the shaft 114 by a collar 116, Fig. 1, fixed to the shaft and may be likewise connected to the rod 112 by a crank arm 117, Fig. 1, the construction being such that upon rocking movement of the shaft 114, through the means to be presently described, the jaw closing rod 112 will be appropriately operated.

Mounted upon the rod 114, Fig. 1, is the rack segment 118 which is oscillated at desired times by means of a rack 119 deriving its motion from a suitable cam to be presently described. In order that the rack 119 and segment 118 may continue in operative engagement when the jaw carrier 97 is moved longitudinally, the segment 118 is splined to the shaft 114 as by the square portion 120 formed on the shaft and the segment is held between collars 121 rising from the gripper carrier frames 69, the construction being such that while the gripper carrier 97 may move longitudinally, the segment 118 is held from movement longitudinally with the carrier 97.

Mounted to rock upon the shaft 122, Figs. 1, 22 and 23, is a lever 123, one arm of which is connected by a link 124 to the rack 119, Figs. 1 and 22, the construction being such that upon rocking movement of the lever arm 123 on the shaft 122, the rack 119 and perforce, the segment 118 will be appropriately moved to rock the shaft 114 and operate the grippers.

The shaft 122 as indicated in Figs. 1 and 22, extends transversely of the drawing-in or gripper frame and is mounted in bearings 125 carried by said frame. The drawing-in means or grippers and gripper carrying frame 69 move transversely of the machine, as hereinbefore described; therefore, the lever 123 is mounted loosely upon the shaft 122 so that it may slide longitudinally thereon. To insure this sliding movement and at the same time to further sustain the shaft 122, the latter is further supported by brackets 126 secured to and rising from the gripper carrying frame 69, Figs. 1 and 22.

Extending transversely of the drawing-in or gripper frame and appropriately supported in bearings 127, Fig. 2, is the cam shaft 128, Figs. 2 and 22, on which is mounted the gripper actuating cam 129 having the cam paths for engagement with an arm 130 connected to the lever 123, hereinbefore described, the construction being such that upon rotative movement of the cam 129, the lever 123 will be appropriately raised and lowered to operate the gripper jaws.

Obviously, the cam 129 moves transversely with the gripper carrying frame 69 with which it is associated, and therefore said cam 129 is splined for sliding movement upon the shaft 128, the construction being such that as the gripper carrying frame 69 moves transversely as hereinbefore described, the cam 129 moves the grippers. In order to further support the shaft 128 at a point near the cam 129, the gripper carrying frame 69 has rising therefrom the bearing 131, Fig. 22.

As hereinbefore noted, the present invention contemplates that the drawing-in means or grippers shall move transversely of the machine to carry a plurality of reinforcing filaments into transverse relation with the receiver upon which they are to be placed. In order that the receiver may properly take the reinforcing filaments without disturbing their initial relation, as determined by the drawing-in means, the present invention contemplates that the drawing-in means, after having drawn the filaments or threads into transverse relation with the receiver, shall travel along with the receiver as the filaments or threads are transferred thereto. The receiver of course may either be the fabric itself on which the threads or filaments are to be adhesively applied, or it may be the carrier which is illustrated as the preferred form of the present invention. It is therefore appropriate at this time to describe the means for moving the drawing-in means or grippers in the direction of receiver movement while the threads are being transferred to the receiver.

It has heretofore been noted that the gripper carrier 97 is movable longitudinally of the gripper carrier frame 69, and to effect this relative longitudinal movement, means are provided between the gripper carrier 97 and the gripper carrying frame 69 which not only imparts the desired movement, but also locks the gripper carrier at the end of its longitudinal reciprocating movements, so that the grippers may be unerringly positioned for engaging the threads to carry them into transverse relation with the receiver.

In the present instance of the invention, the gripper carrier 97 and the gripper carrying frame 69 are operatively connected for relative longitudinal movement by toggle means which, in the present instance of the invention, see Fig. 23, comprises the toggles 132 and 133, the former being pivoted at 134 to the gripper carrying frame 69 and the latter to the gripper carrier 97 at 135. The gripper carrier 97 is preferably provided with a block 136 secured thereto adjustably as indicated in Fig. 23, and to this block at 135 the arm 133 of the toggle is pivotally joined.

The toggles 132 and 133 are pivotally connected together and to the link 137 at 138, Fig. 23, the upper end of the link 137 being pivoted to a lever arm 139 which is mounted to rock upon the shaft 122. The arm 139 is extended to the opposite side of the shaft 122 as at 140, and has a roll 141 to be engaged by the cam path 142 of a cam 143 splined to the shaft 128, Fig. 23, the construction being such that upon rocking movement of the lever 139 by the cam 143, the toggles 132 and 133 will be appropriately moved to cause relative longitudinal movements of the gripper carrying frame and the gripper carrier.

When the gripper carrier reaches its longitudinal position for drawing in the transverse filaments, it is desirabe that the gripper carrier and, perforce, the grippers carried thereby, shall be locked from movement so that when the grippers are moved transversely to engage the threads preparatory to carrying them transversely of the machine, they shall be properly positioned, and all lost motion be prevented. To this end, see Fig. 23, there is pivoted at 144 to the gripper carrier 97, one end of a link 145, the other end of the link being pivoted at 146 to the end of a corresponding link 147 pivotally connected at 148 to the gripper carrying frame 69, the construction being such that the links 145 and 147 constitute a toggle which, when the gripper carrier 97 has been moved longitudinally to the right, Fig. 1, by the upward movement of the toggles 132, 133, said toggles 145, 147 will be straightened into position shown by full lines, Fig. 23, to thereby lock or hold the gripper carrier and grippers in their final position of rest longitudinally of the gripper carrying frame 69. When, however, the grippers have made their excursion across the machine to draw in the transverse threads, and have returned with the transverse threads held by them, the present invention contemplates that the threads shall then be moved longitudinally along with the receiver which is to take the threads or filaments; consequently, it is necessary first to unlock the toggles 145 and 147 before the toggles 132, 133 through the action of the cam 143 can move the gripper carrier longitudinally. Various forms of means may be used for this purpose, but in the present instance of the invention, one of the levers 147 has a toe portion 149 which is adapted to be struck by a trip 150, Fig. 23, carried by one end of a lever 151 pivoted to the gripper carrying frame 69 at 152. The opposite end of the lever 151 carries a roll 153 which is adapted to be moved by a cam projection 154 on the cam 143 as the latter rotates, the construction being such that at the moment the drawing-in means or grippers have drawn in the transverse threads, the lever 151 will be operated to unlock the toggles 145, 147 to thereby permit the toggles 132, 133 to move the gripper carrier 97 longitudinally, the toggles 145 and 147 during such longitudinal movement taking the position indicated by dotted lines in Fig. 23.

From the construction described, it will be apparent that the cam carrying shaft 128 rises and falls with the drawing-in or gripper frame, and in order that appropriate rotative movement may be imparted to the cam carrying shaft, regardless of the varying positions assumed by the shaft, the present invention has provided a novel actuating train of mechanism for the cam carrying shaft 128. Mounted on the upper cam carrying shaft 128 is a link 155, Fig. 1, and similarly mounted to rock upon the shaft 86 is a similar link 156, Fig. 1, said links being pivotally connected at their meeting ends at 157. Mounted upon the links 155 and 156 where they are pivotally connected at 157, is a gear 158 which, at either side thereof is in operative engagement with an idler 159 suitably mounted upon each of the links 155 and 156.

Secured to the cam carrying shaft 128 is a gear 160 which meshes with one of the idlers 159 on the link 155 and similarly on the shaft 86 is the gear 161, Fig. 1, which meshes with the idler 159 on the link 156, the construction being such that as the drawing in or gripper frame moves up and down, operative engagement of the gear 160 with the driving gear 161 through the train of mechanism explained, will continue uninterruptedly.

In the present instance of the invention, the drawing in means is shown as comprising a series of grippers at each side of the machine which move toward and from the median line of the machine to carry the threads or filaments from the supply side of the machine and deliver them to the grippers at the opposite side of the machine so that they may be drawn conveniently into transverse relation with respect to the receiver or the material to be reinforced. It is found preferable to have a series of grippers at each side of the machine movable toward and from each other at the median line of the machine to expedite or facilitate the drawing-in operation, but the invention is not, of course, restricted to this detail, and in some cases it will not be necessary to use two series of grippers one at either side of the machine, although such arrangement gives highly satisfactory results.

After the drawing-in means has drawn the threads or filaments transversely, the filaments and the receiver upon which they are to be placed are moved in a direction of approach, as hereinbefore described. In the present instance of the invention, this is effected by moving the drawing-in means or grippers toward the receiver, but of course this relative approach may be effected by a movement of the receiver toward the drawing-in means or grippers. In any event, however, the present invention contemplates that the drawing-in means or grippers and receiver, whether the latter be the fabric to be reinforced or a carrier, such as illustrated and described, shall be locked together or held from relative movement during the time the filaments or threads are being transferred from the drawing-in means or grippers to the receiver. To effect this locked condition of the drawing-in means or grippers and receiver, various forms of means may suggest themselves to those skilled in the art, but in the present form of the invention the drawing-in means or grippers have associated therewith one member of a lock while the receiver or carrier for the transverse threads, whichever the case may be, has another member of a lock. These locking members serve to hold the drawing-in means and receiver in fixed relation to prevent any relative movement thereof during the time the filaments or threads are being transferred from the drawing-in means to the receiver.

Figure 9:
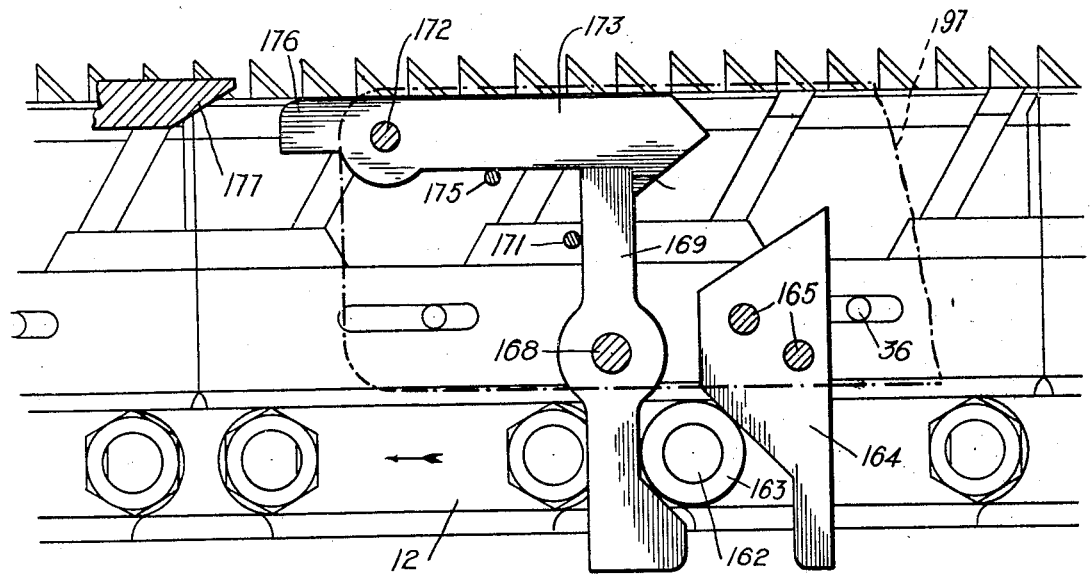
Fig. 9 is an enlarged view showing one form of means for causing the drawing in means and the carrier for the transverse filaments to be held in relatively fixed position during the transfer of the reinforcing filaments from the drawing in means to the carrier.
Figure 10:
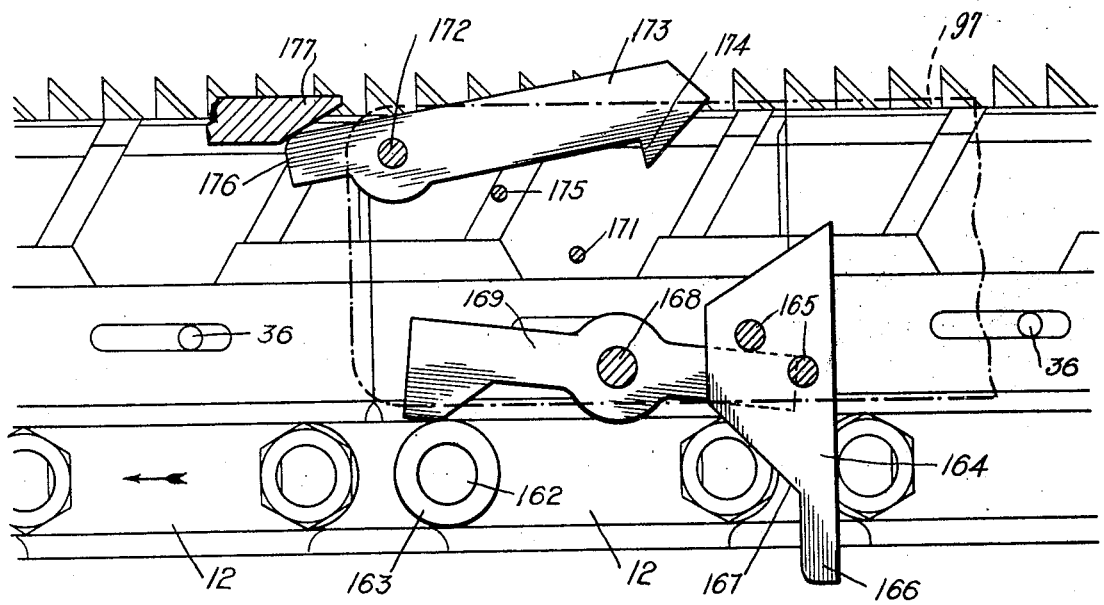
Fig. 10 is a view similar to Fig. 9, with the locking means in unlocked position.

This locking means may take various forms, but in the present instance of the invention, the carrier or chain at each side of the machine has fixed thereto or projecting therefrom, a pin 162, which is preferably provided with a roll 163 which moves along with the carrier or chain in the direction indicated by the arrow, Figs. 9, 10 and 11.

The drawing-in means or gripper carrier which is graphically shown by dotted lines in Figs. 9, 10 and 11, has secured thereto a fixed projecting member 164. This may be secured to the gripper carrier in any convenient position as by the bolts or pins 165. The projecting piece 164 has a narrowed lower portion 166, see Figs. 9, 10 and 11, and an incline portion 167. Pivotally mounted at 168 on the gripper carrier or part projecting therefrom, at a point adjacent the fixed member 164, is the pivoted member 169, the lower portion of which has an incline 170 similar to the incline 167 on the fixed member 164. The pivoted member 169 may be weighted at its lower end or if desired, a spring may be employed for normally holding this member in position as indicated in Fig. 11, that is, in substantial vertical position, a stop pin 171 being employed to determine its operative position under the action of gravity or the spring. Pivotally mounted at 172 on the gripper carrier or part movable therewith, is a latch 173 having an end catch portion 174 adapted to engage the outer end of the pivoted member 169 and hold it from swinging movement on its pivot when the parts are in the position indicated by Fig. 11, a stop 175 preferably being employed to hold the latch 173 in operative position.

From the construction thus far described with respect to the means for connecting the drawing-in means and the receiver or carrier, it will be apparent that when the drawing-in means and the receiver or carrier are moved in a direction of approach, the roller 163 on the pin 162 of the carrier will enter between the ends of the fixed and pivoted member of the lock and then, on further movement in the same direction, the pin and roller will engage the incline portions between the pivoted and fixed member of the lock and cause the drawing-in means or grippers and the carrier to have a slight movement relative to each other as the threads or filaments are passed downward between the incline holding fingers of the carrier, and thereafter the drawing-in means or grippers and the carriers will be locked in fixed relation or so that they can have no relative movement until after the carrier has assumed control of the filaments or threads, in the manner hereinbefore described. After the carrier has assumed control of the threads or filaments and they have been cut or freed from the source of supply and the drawing-in means, the drawing-in means may be returned to its initial position, that is, the drawing-in means and the carrier may be moved in a direction of separation; and to effect this, it is first necessary to unlock the connection between the two. This may be done by various means, but in the present instance of the invention it is accomplished by providing a toe 176, Figs. 9, 10 and 11, on the latch 173 which is adapted as the drawing-in means and carrier move longitudinally together, to engage the incline surface of a trip 177 secured to or projecting from the gripper carrying frame 69, the construction being such that when the toe 176 meets the incline of the trip 177, the latch 173 is raised, thereby permitting the drawing-in means or grippers to come to rest while the carrier continues its movement in the direction of the arrow, Fig. 10, and turns the pivoted member 169 of the lock so that the drawing-in means and the carrier become unlocked, and the drawing-in means is then free to be returned to initial position by the means hereinbefore explained.

The filaments or threads now being held by the holding fingers of the carrier, are moved toward the fabric to be reinforced, in the present instance of the invention, and as they are laid upon the fabric, as hereinbefore explained, the filaments or threads are freed from the holder by the arms 55 of the holder trip 54, as hereinbefore described.

It has heretofore been stated that in the present form of the invention, the drawing-in means or gripper mechanism is moved toward and from the receiver or carrier, and this is effected by raising and lowering the drawing-in or gripper frame as hereinbefore described, through the gears 61. It may be appropriate at this time, to refer to the means for operating the gears 61 or the shaft 82 on which they are mounted, and to this end, attention is called to Figs. 4 and 27. Mounted on the cam shaft 86 is a cam 178 having a cam groove 179, Fig. 27, in which travels a roll 180 on an arm 181 pivotally connected at 182 to a rocker arm 183 extending downward from and secured to the rocker shaft 82, the construction being such that upon rotation of the cam 178, the rocker shaft 82 will be given its appropriate rocking movements for raising and lowering the drawing-in or gripper carrier frame.

Where a plurality of threads or filaments are taken by the drawing-in or gripper mechanism and carried transversely of the machine, it is desirable that the drawing-in or gripper frame shall be locked and fixed at the end of its transverse movements, as hereinbefore noted; and this is more particularly desirable when the drawing-in means comprises two sets of grippers, one at either side of the machine, which move toward and from each other for transferring threads from one to the other and completing their transverse movements. An important feature of the present invention, therefore, consists in means for locking the drawing-in means at the end of its transverse movement, and a convenient form of means to this end will now be explained, although the invention is obviously not limited thereto.

Each of the gripper carrying frames 69 is provided at each end thereof with a downwardly-projecting pin which, when the gripper frames are moved to either the outer or inner positions, engage with the slotted locking arms acting to hold the gripper frames in their final outer or inner positions.

Figure 24:
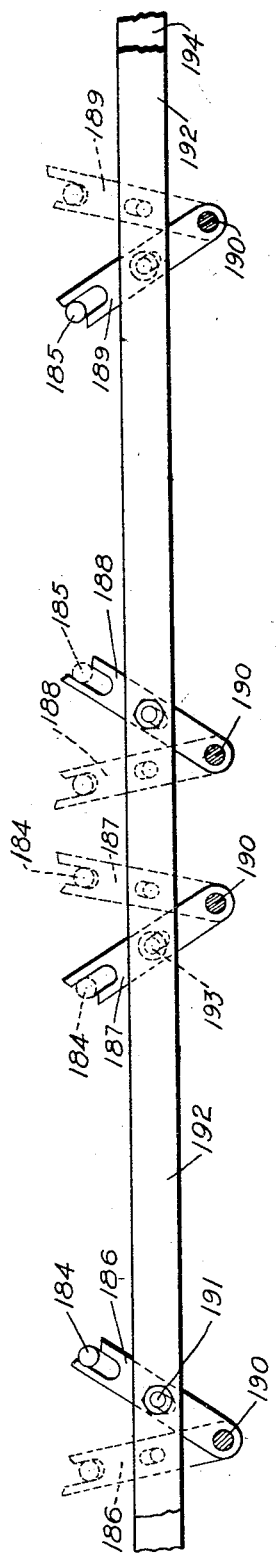
Fig. 24 is an enlarged detail showing the means for locking the drawing in means or grippers at the ends of their transverse movements.

A good, practical form of this locking feature of the invention will now be explained, and since the locking feature for each of the gripper carrying frames is the same, a description of one will be sufficient. Referring to Fig. 24 of the drawings: the pin 184 indicates the pin projecting downwardly from the gripper carrying frame at the left-hand side of the machine and the pin 185 indicates the pin projecting from the gripper carrying frame at the right-hand side of the machine.

Co-acting with the pin 184 are the two slotted locking arms 186 and 187; similarly co-acting with the pin 185 are the slotted locking arms 188 and 189, and since the locking arms 186 and 187 and 188 and 189 act substantially the same on their respective gripper carrying frames, a clear description of the construction and operation of the locking mechanism will best be subserved by a description of the locking arms 186 and 187 in their relation to the pin 184.

Figure 25:
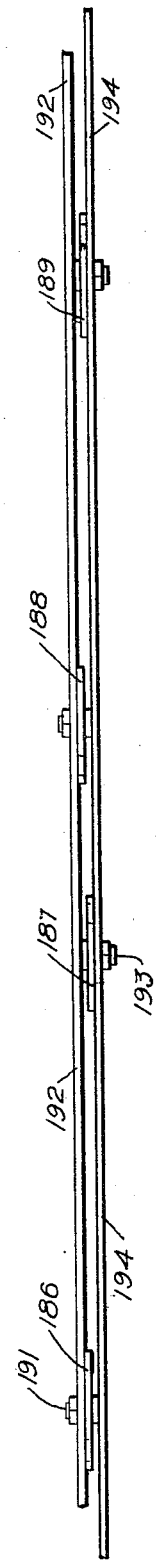
Fig. 25 is an edge view of the parts shown in Fig. 24.

The locking arms 186 and 187 are pivotally mounted at 190 to a fixed portion of the drawing-in or gripper carrying frame and each is provided with a slotted end as indicated in Fig. 24. The locking finger 186 has a pin connection at 191 with a sliding actuator 192, whereby the locking arm 186 may be moved from the full to dotted line position, as indicated. Similarly, the locking arm 187 is provided with a slotted end and is pivotally connected at 193 to a sliding actuator 194 below the actuator 192, the construction being such that when the gripper carrying frame is moving to outer position at the side of the machine, or to the left in Fig. 24, the locking finger 186 will be moved by its actuator 190 into the position indicated by full lines at the right, Fig. 24, so that the pin 184 may enter the slotted end of the locking arm 186. As the gripper carrying frame moves to its full outer position as indicated by dotted lines at the left, Fig. 24, the actuator 192 will turn the locking arm 186 into dotted line position, and then the actuator 192 will be itself locked by means presently to be described, to thereby hold or lock the gripper carrying frame in its outer position. When the gripper carrier frame starts to move to its inner position or toward the opposite side of the machine, the actuator 192 is moved to the right, Figs. 24 and 25, and permits the pin 184 to pass out of the locking slot and the gripper carrying frame, therefore, is freed to move transversely to its other position. While the actuator 192 was moving the locking arm 186 as above described, the actuator 194 was moving the locking member 187 in reverse position, so that when the pin 184 is approaching the median line of the machine, it will enter the slotted end of the locking arm 187, and then the arm 187 will be moved by its actuator into the dotted line position to thereby lock the gripper carrying frame at the end of its transverse travel toward the opposite side of the machine or median position, in the present instance of the invention. The action of the locking arms 188 and 189 with respect to the pin 185 of the other gripper carrying frame is the same as that already described with respect to the locking arms 186, 187 and the pin 184 of the other gripper carrying frame, and will be clearly understood from what has already been described.

Figure 3:
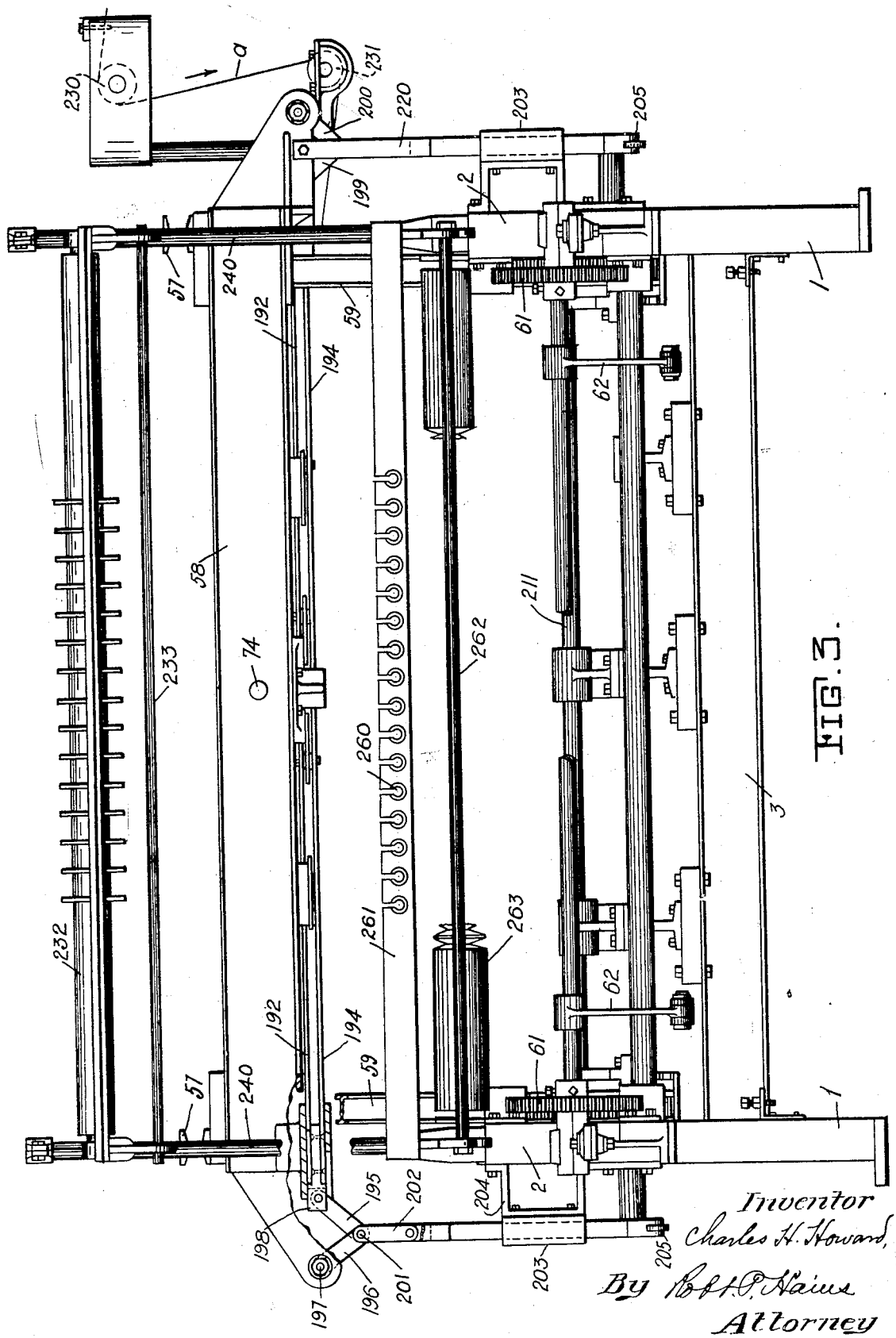
Fig. 3 is an end elevation of the machine looking from the left, Fig. 2.

From the construction thus far described, it will appear that the two locking slides 192 and 194 which control the locking arms 186, 187, 188 and 189, must themselves be locked in order to secure the locking conditions desired. This may be effected by any suitable means, but as illustrated in the present instance, is secured by means of the toggles 195 and 196, one of which is pivoted at 197 to the rising and falling drawing-in or gripper frame, or a bracket projecting therefrom, as indicated in Fig. 3, and the other member 195 of which is pivotally connected to a block 198, Fig. 3, to which one of the sliding actuators, as for instance 194, is secured. The other actuator 192 is similarly operated by similar toggles 199 and 200 at the opposite side of the machine.

Pivotally connected at 201 to the toggles 195 and 196, is a vertically movable rod 202, the lower end of which passes through a guide 203 formed on a bracket 204, Fig. 3, extending from the side members 2 of the machine. At its lower end the rod 202 is pivotally connected at 205, Figs. 1 and 3, to an operating lever 206, pivotally mounted in the machine frame at 207 and connected by a link 208 to the pin 209 of a bell crank 210, Fig. 1, mounted on the shaft 211, Figs. 1, 3, 4 and 26. In order to impart the necessary rocking movement to the shaft 211 to straighten and break the toggle and thereby lock or move the actuating slides 192 or 194, as the case may be, the shaft 211 has extended therethrough, the arm 212, Fig. 26, to which is connected a rod 213, the other end of which is jointed to an arm 214 extending from and loose upon the shaft 82 which thereby serves merely for a support for the arm 214. Pivotally mounted at 215, Fig. 26, to the arm 214 is the cam actuated member 216 having a roll 217 which is adapted at times to be engaged by suitable cam lugs 218 carried by the cam 219, the construction being such that when the gripper carrying frame approaches one limit of its movement either toward or from the side of the machine, the cam 219 acts upon the cam actuated member 216 to rock the shaft 211 and thereby straighten the toggle 195 and 196 and lock the appropriate locking arm and perforce, the gripper carrying frame associated therewith.

It is necessary to hold the gripper carrying frames locked in their outer position as the gripper carrying frames are moved downwardly to deposit or transfer the filaments or threads to the receiver or carrier beneath; and to maintain this locked condition of the toggles 195, 196 as the frame moves downward, there is projecting downward from the drawing in or gripper frame the rigid arm 220, which extends through the guide 203 along the side of the vertically movable rod 202 which actuates the toggle. The rigid arm 220 has a recess portion 221, see Fig. 12, in which is pivotally mounted at 222, a catch 23 having a shouldered portion 224 adapted to engage a complementary shouldered portion 225 on the arm or rod 202 as the gripper carrying frame and perforce, the rods 202 and 220 move downward. Since the cam 219 does not maintain control of the rocking shaft 211 continuously, it is evident that as the gripper carrying frame moves downward and the cam loses control of the rock shaft, the rod 202 should be prevented from moving downward relatively to the gripper carrying frame or its attached rigid part 202. In other words, the toggle actuating rod 202 should be locked to the gripper carrying frame or member 220 as the gripper carrying frame moves downward. To effect this, the guide or casing 203 is provided, see Fig. 12, with a recessed portion 226 into which the locking member 224 may project, and said recessed portion 226 has a shouldered portion 227, which, as the member 220 moves downward, engages the back of the locking member 223 and turns it about its pivot to cause the shouldered portion 224 of the catch to engage the shouldered portion 225 in the toggle actuating rod 202, so that thereafter, the toggle actuating rod 202 and perforce the toggle, are locked from movement relatively to the gripper carrying frame.

When the filaments or threads have been delivered to the receiver or carrier by the drawing-in or gripper means, and the gripper carrying frame is raised, it is desirable that the toggle actuating rod 202 be unlocked and freed to movement under the dictates of the cam 219. To this end, the casing or guide 223 has an inwardly-projecting toe 228, Fig. 12, which, as the toggle actuating rod 202 and rigid member 220 rise together, engages the end 229 of the trip 223 and pulls it from under the shoulder 225, thereby permitting the toggle to be broken under the dictates of the cam 219 and the drawing-in means or gripper carrying frame associated therewith to be unlocked and freed to its transverse movements.

The toggle locking and unlocking means for the sliding actuators 192 and 194 has been described in connection with one toggle, but it is to be understood that the other toggles at the end portions of each of the gripper carrying frames are likewise operated.

The transverse reinforcing filaments or threads are taken from one side of the machine and delivered in transverse relation thereto by the drawing-in means, the action of which when under speed, occasionally causes a breakage of the threads. In the construction illustrated in Fig. 3, the transverse threads $a$ are led from a source of supply over a grooved roller 230, Fig. 3, and from there pass downward to another grooved roller 231 at the side of the machine, whence they pass in separated relation to the drawing-in or gripper mechanism. Should one of the transverse threads become broken, it is necessary only to attach the broken end to the adjacent transverse thread which thereupon carries it transversely with itself to be laid upon the receiver, and on the next drawing-in movement, the previously broken thread or filament will assume its proper relation with relation to the drawing-in or gripper mechanism by reason of the separated relation of the filaments or threads as they pass around the grooved roller 231. Thus, should a transverse thread become broken, it is introduced into its proper place relative to its companion without stopping the machine.

Figure 32:
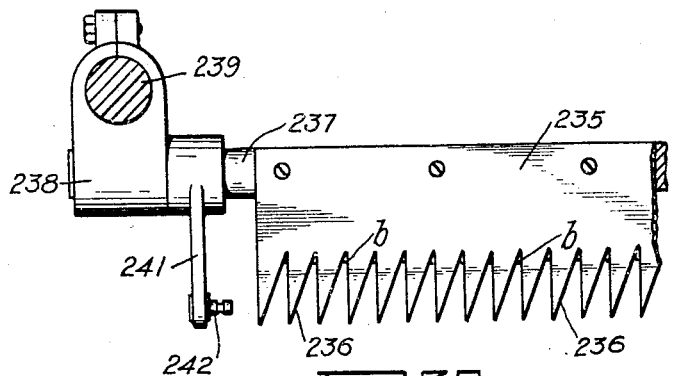
Fig. 32 is a detail showing one form of longitudinal thread guiding means.
Figure 33:
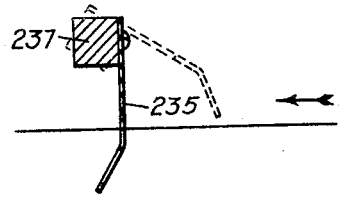
Fig. 33 is a cross section of the guiding means shown by Fig. 32, and indicating the direction of travel of the longitudinal threads with respect thereto.

In addition to the transverse reinforcing filaments, it is sometimes desirable to lay the longitudinal reinforcing threads upon a fabric, and as illustrated in Figs. 1 and 2, such longitudinal threads $b$ are taken from a source of supply and led over suitable guiding devices 232, Figs. 1 and 2, and then about a tension device 233, whence they pass over a guide roller 234 and through a toothed separating device 235. This toothed separating device 235 is better indicated in Figs. 32 and 33, wherein it is shown as composed of sheet material having projecting teeth 236 between each of which passes one of the longitudinal reinforcing filaments b. In order to keep these reinforcing filaments in their proper separated relation, it is desirable to oscillate the separator 235 and to this end it is mounted upon a rocker 237 which is mounted in suitable bearings 238 depending from a supporting rod 239 extending above the machine. The rods 239 may be appropriately supported at each end, as by the struts 240. Extending from and secured to the rocker 239 is an arm 241 having a projecting pin or other securing device 242 by which it is connected to a flexible cord or chain 243 which bears over a guide pulley 244 and has its end secured at 245 to the rising and falling drawing-in or gripper frame, the construction being such that as the drawing-in or gripper frame moves up and down, it will swing the separator 235 into the dotted and full line positions indicated in Fig. 33, to thereby properly separate the longitudinal threads, should they become crossed or tangled.

From the separator 235, the longitudinal threads pass over a suitable guiding means such as the roller 246, Figs. 1 and 2, and about a guide roller 247 carried by a bracket 248 which may be appropriately secured to one of the struts 240 and from the guide roll 247 the threads or filaments pass downward about suitable guiding devices and around the laying-on roll 11 between which and the roll 10 the fabric to be reinforced passes.

Figures 29, 30, 31:
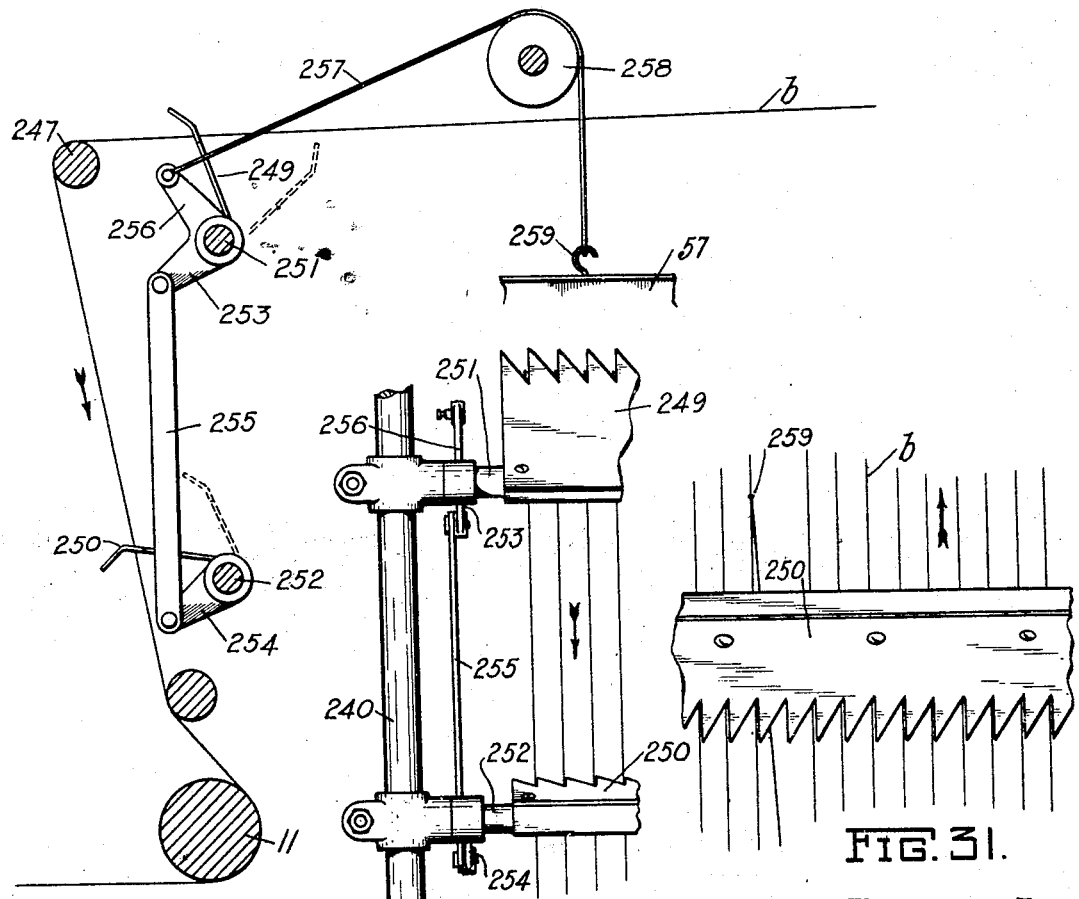
Fig. 29 is an enlarged detail, partly in section, showing the means for controlling the longitudinal reinforcing filaments or threads.
Fig. 30 is a partial front elevation of the parts shown in Fig. 29.
Fig. 31 is a detail with parts broken away, showing how, when a longitudinal thread is broken, it may be introduced to its proper position in the machine without stopping the latter.

It is desirable before the longitudinal threads b pass to the surface of the fabric to be adhesively secured thereto, that their separated relation be insured; and this is effected in the present instance of the invention by the two separators 249 and 250, best shown in Figs. 29, 30, and 31. The separators 249 and 250 are mounted respectively on the rockers 251 and 252, and said rockers have projecting arms 253 and 254 respectively, connected by a link 255 so that should one of the rockers be rocked upon its axis, the two separators 249 and 250 will be moved in unison, first to engage and separate the threads by the inclined toothed formation of the separators, and then pass from between the threads and back again. This action of the separators is effected in the present instance by connecting one of the rockers as 251 by means of the arm 256 by a flexible cord or chain 257 with the rising and falling drawing-in or gripper frame. The flexible connection 257 passes over a guide roll 258 and the end thereof is connected by suitable means such as the hook 259, to the side bars 57 of the drawing-in or gripper frame. From the construction described, it will be apparent that should one of the longitudinal threads b become broken, it is necessary only to attach it as illustrated in Fig. 31 at 259, to an adjacent longitudinal thread which, as it moves forward, will carry the broken thread with it and the teeth of the separators 249 and 250 formed as illustrated in Fig. 31, will pass between the thread that has been broken and its adjacent thread to which it has been attached, and cause it to gradually assume its proper parallel relation with its companion threads or filaments.

The longitudinal threads or filaments just described are laid upon the transverse filaments as said transverse filaments and the fabric pass between the rolls 10 and 11. If desired, other longitudinal reinforcing filaments c may be introduced below the transverse threads and arranged in alternate relation with the longitudinal threads above the filaments. In the present instance of the invention, the second series of longitudinal threads c pass through appropriate guide eyes 260, Fig. 3, formed in a cross-bar 261 and then, as in the case of the first series of longitudinal filaments described, they pass about an appropriate tension roll 262 and about a grooved separating roll 263, Figs. 1 and 3, whence they are led under the transverse filaments to the nip between the rolls 10 and 11.

The paper to be reinforced is preferably coated with an adhesive and the filaments, both transverse and longitudinal, if the latter are used, may be inclosed between two plies of paper or simply laid upon the adhesive surface of one ply. It may be appropriate at times to provide adhesive in the form of water-proof material. The source of paper supply also may be either a roll or the paper may be taken directly from a paper-making machine.

In order that the cam shaft 86 may be driven from the driving shaft as indicated in Fig. 2, the cam shaft 86 has mounted thereon a gear wheel 264 which is connected to the drive shaft 7 through the train of gears 61, 65 and 64, Fig. 2.

The construction hereinbefore described constitutes a good, practical form of the present invention, but it is to be understood that the details of the mechanism described may be varied within the true scope of the invention as pointed out in the claims.

What is claimed is:—

1. In a machine for reinforcing fabrics, the combination of means for feeding the fabric to be reinforced, means for distending a plurality of reinforcing filaments transversely relative to the fabric to be reinforced, means for taking the reinforcing filaments from the distending means for delivery to the fabric, and means for holding the distending means and taking means in relatively fixed positions as the reinforcing filaments are transferred from one to the other.

2. In a machine for reinforcing fabrics, the combination of means for directing the fabric in its path of travel, means for distending reinforcing filaments transversely relative to the path of travel of the fabric, a carrier, means for transferring the filaments from the distending means to the carrier, and means for locking the distending means and carrier in fixed relation as the filaments are transferred from the distending means to the carrier.

3. In a machine for reinforcing fabrics, the combination of means for directing the fabric in its path of travel, means for distending reinforcing filaments transversely relative to the path of travel of the fabric, a carrier, means for causing the filaments to be transferred from the distending means to the carrier, means for locking the distending means and carrier in fixed relation as the filaments are transferred from the distending means to the carrier, and means for freeing them from such locked relation after the filaments have been transferred.

4. In a machine of the character described, the combination of a receiver for receiving transversely disposed reinforcing filaments, means for distending reinforcing filaments transversely of the receiver, means for causing the filaments to be transferred from the distending means to the receiver, and means for causing the distending means and receiver to be held immovable relative to each other as the reinforcing filaments are transferred from the distending means to the receiver.

5. In a machine of the character described, the combination of a receiver for receiving transversely disposed reinforcing filaments, means for distending reinforcing filaments transversely of the receiver, means for causing the filaments to be transferred to the receiver, means for causing the distending means and receiver to be held immovable relative to each other as the reinforcing filaments are transferred from the distending means to the receiver, and means for freeing them from such immovable relation that they may be independently moved after the reinforcing filaments have been transferred.

6. In a machine of the character described, the combination of a receiver for receiving transversely disposed reinforcing filaments, gripper means movable transversely relative to the receiver for distending reinforcing filaments transversely of the receiver and transferring them thereto, and means for holding the gripper means and receiver from relative movement as the reinforcing filaments are transferred from the gripper means to the receiver.

7. In a machine of the character described, the combination of a receiver for receiving transversely disposed reinforcing filaments, means for distending reinforcing filaments transversely of the receiver and transferring them thereto, means for causing the distending means and receiver to be held immovable relative to each other as the reinforcing filaments are transferred from the distending means to the receiver, and means for freeing the reinforcing filaments from the distending means.

8. In a machine of the character described, the combination of means for feeding the material to be reinforced, means for drawing reinforcing filaments from a source of supply, a carrier for receiving the reinforcing filaments in predetermined lengths from the drawing means and delivering them in transverse relation to the material to be reinforced, and means for locking the drawing means and carrier together as the reinforcing filaments are transferred from the drawing means to the carrier.

9. In a machine of the character described, the combination of means for feeding the material to be reinforced, means for drawing reinforcing filaments from a source of supply, a carrier for receiving the reinforcing filaments in predetermined lengths and delivering them in transverse relation to the material to be reinforced, means to effect transfer of the filaments from the drawing means to the carrier, means for locking the drawing means and carrier together as the reinforcing filaments are transferred from the drawing means to the carrier, and means for freeing the reinforcing filaments from the carrier.

10. In a machine of the character described, the combination of means for drawing reinforcing filaments from a source of supply, a receiver for receiving the reinforcing filaments transversely in predetermined lengths, means for moving the drawing means and receiver in a direction of approach to transfer the transverse filaments onto the receiver, and means for causing the drawing means and receiver to be held immovable relative to each other as the filaments are transferred from the drawing means to the receiver.

11. In a machine of the character described, the combination of grippers for drawing reinforcing filaments from a source of supply, a receiver for receiving the reinforcing filaments transversely in predetermined lengths, means for moving the grippers and receiver in a direction of approach to transfer the reinforcing filaments to the receiver, and means for locking the grippers and receiver together when moved into transferring position for the transfer of the reinforcing filaments to the receiver.

12. In a machine of the character described, the combination of means for drawing reinforcing filaments from a source of supply, a receiver, means for moving the receiver in a direction transversely relative to the drawing movement of the drawing means, and means for locking the drawing means and receiver in immovable relation as they move together in the direction of receiver movement.

13. In a machine of the character described, means for feeding a fabric to be reinforced, drawing means for drawing reinforcing filaments in predetermined lengths from a source of supply, means for moving the drawing means toward the fabric, a carrier at each side of the machine movable toward the fabric, means to effect transfer of the filaments from the drawing means to the carrier, and means for locking the drawing means and carriers together to transfer the filaments from the drawing means to the carriers as the drawing means and carriers move toward the fabric.

14. In a machine of the character described, means for guiding a fabric, drawing means for drawing reinforcing filaments from a source of supply, a carrier for receiving the filaments from the drawing means and delivering them transversely to the fabric, means for transferring the filaments from the drawing means to the carrier, and means for locking the drawing means and carrier for movement in unison as the filaments are delivered from the drawing means to the carrier.

15. In a machine of the character described, means for guiding a fabric, drawing means for drawing reinforcing filaments from a source of supply, a carrier for receiving and effecting transfer of the filaments from the drawing means and delivering them transversely to the fabric, means for locking the drawing means and carrier for movement in unison as the filaments are delivered from the drawing means to the carrier, and means for freeing the filaments from the drawing means that they may be delivered to the fabric.

16. In a machine of the character described, the combination of means for guiding a fabric to be reinforced, means for drawing a plurality of threads or filaments into transverse relation thereto, a carrier for taking the transverse threads or filaments from the drawing means for delivery to the fabric, and means for moving the drawing means with the carrier as the threads or filaments are being transferred from the drawing means to the carrier.

17. In a machine of the character described, the combination of means for guiding a fabric to be reinforced, means for drawing a plurality of threads or filaments into transverse relation thereto, a carrier for taking the transverse threads or filaments from the drawing means for delivery to the fabric, means for moving the drawing means with the carrier as the threads or filaments are being transferred from the drawing means to the carrier, and cutting means for freeing the threads or filaments from the drawing means when they have been transferred to the carrier.

18. In a machine of the character described, the combination of means for drawing a plurality of reinforcing filaments from a source of supply and placing them in position transversely of the machine, means for moving the drawing means transversely, and means for locking the drawing means in fixed position at the end of its transverse movement.

19. In a machine of the character described, the combination of means for drawing a plurality of reinforcing filaments from a source of supply and placing them in position transversely of the machine, means for moving the drawing means transversely, and means for locking the drawing means at each end of its transverse movement.

20. In a machine for reinforcing a fabric by transversely disposed reinforcing filaments, the combination of means for drawing filaments from a source of supply, means for moving the drawing means transversely of the machine, means for locking the drawing means from further transverse movement after it has drawn the reinforcing filaments transversely, and a receiver for receiving the transverse threads in predetermined lengths from the drawing means.

21. In a machine of the character described, the combination of grippers for drawing a series of reinforcing filaments from a source of supply and placing them transversely of the machine, a carrier formed of links each having holding means for holding the transverse filaments when delivered thereto by the grippers, and a cutter movable with the carrier for cutting the reinforcing filaments from connection with the grippers while held by the carrier.

22. A carrier for transporting transverse reinforcing filaments, comprising a chain having a series of links carrying holding means for the transverse filaments and a cutter associated with the holding means, and means for actuating the holding means to grasp and hold the transverse filaments and to cause the cutter to cut the filaments held by the holding means.

23. A carrier for transporting transverse reinforcing filaments, comprising a chain having a series of links each carrying holding means for the transverse filaments and a cutter, and means for actuating the holding means and cutter to hold and cut the filaments.

24. In a machine of the character described, the combination of means for drawing a series of reinforcing filaments from a source of supply, a carrier having means for engaging the reinforcing filaments and taking them from the drawing means, means for moving the carrier toward the fabric to be reinforced to place the filaments transversely upon the fabric while held by the carrier, and means for successively freeing groups of transversely arranged filaments from the carrier as they are successively applied to the fabric.

25. In a machine of the character described, a series of grippers, means for moving them transversely of the machine to draw a series of reinforcing filaments from a source of supply, a carrier for taking the reinforcing filaments from the grippers, means for freeing the filaments from the source of supply and grippers, means for guiding the fabric, and means for moving the carriers toward the fabric to deliver the reinforcing filaments thereto while held taut by the carrier, and means acting after the filaments have been delivered to the fabric for freeing them from the carrier.

26. In a machine of the character described, the combination of means for placing threads transversely, a carrier for taking the threads from the said means and delivering them in predetermined lengths to the fabric to be reinforced, said carrier comprising a series of links, each carrying a separate cutter, and means for actuating the cutter to cut the threads when taken by the links of the carrier.

27. In a machine of the character described, the combination of means for drawing reinforcing filaments from a source of supply transversely of the machine, laterally open guiding means at the side of the machine for guiding the transverse filaments from the source of supply to the drawing means, said guiding means having portions for separately engaging the filaments and guiding them in a sheet-like relation to the drawing means, that in case of a broken filament, its end may be secured to an adjacent filament and be presented to the drawing means.

28. In a machine of the character described, means for guiding a fabric to be reinforced, means for simultaneously drawing a series of reinforcing filaments from a source of supply transversely of the fabric, means for feeding other filaments longitudinally relative to the fabric to be reinforced, a separator for maintaining the longitudinal filaments in separated relation, and means for moving the separator to insert and withdraw it from between the longitudinal filaments.

29. In a machine of the character described, means for guiding a fabric to be reinforced, means for supplying reinforcing filaments to the fabric to be reinforced, a separator having teeth for separating the reinforcing filaments, and means for moving the teeth relative to the reinforcing filaments.

30. In a machine of the character described, the combination of a vertically movable drawing-in or gripper frame, grippers movable therewith, and means for actuating the gripper jaws, comprising a shaft mounted in fixed position, another shaft movable with the drawing-in or gripper frame, and bodily movable gearing connections between the fixed shaft and movable shaft.

31. In a machine of the character described, the combination of means for distending a plurality of threads transversely of the machine, a carrier comprising separate series of holders for taking the transversely distended threads from the distending means, means for simultaneously closing all the series of holders upon the threads, means for freeing the threads from the distending means when held by the series of holders, and means for freeing the threads from the holders successively as each series of threads is successively secured to the fabric.

32. In a machine of the character described, the combination of means for feeding a fabric to be reinforced, longitudinally of the machine, means for taking a series of reinforcing filaments from a source of supply and distending the same transversely of the machine, carrier means for positively engaging the filaments while held by the distending means, and means to move the carrier means in unison with the fabric to positively position the filaments on the fabric.

33. In a machine of the character described, the combination of means for feeding material to be reinforced, means movable transversely of the machine for simultaneously distending a plurality of independent reinforcing filaments transversely of the material to be reinforced, carrier means movable longitudinally of the machine for grasping the distended filaments and conveying the same with the fabric, means for releasing the filaments from the distending means on or after grasping thereof by the carrier means, and means for holding the distending means and carrier means against relative movement as the filaments are transferred from one to the other.

34. In a machine of the character described, the combination of means for feeding material to be reinforced, means movable transversely of the machine for distending reinforcing filaments transversely of the material, carrier means movable longitudinally of the machine for grasping the distended filaments and conveying the same with the fabric, means for releasing the filaments from the distending means on or after grasping thereof by the carrier means, means for releasing the filaments from the carrying means after they have been conveyed thereby a predetermined distance with the fabric, and means for holding the distending means and carrier means against relative movement as the carrier means grasps the filaments.

35. In a machine of the character described, the combination of means for distending transverse reinforcing filaments, a carrier for transporting the distended filaments comprising a series of jaws having inclined portions, and means for automatically opening and closing said jaws.

36. In a machine of the character described, the combination of means for distending transverse reinforcing filaments, a carrier for taking the filaments from the distending means comprising series of relatively movable jaws, cutter means adjacent said jaws, and a sliding cam coöperating with said jaws and cutter means, for first closing said jaws and then severing the filaments from their source of supply.

37. In a machine of the character described, the combination of means for distending transverse reinforcing filaments, a carrier for taking the filaments from the distending means comprising series of relatively movable jaws, cutter means adjacent said jaws, an operating element for said jaws, an operating element for said cutter means, a cam coöperating with said elements, a slide member for moving said cam to first close said jaws and then sever the filaments from their source of supply, and means for shifting said slide member.

38. In a machine of the character described, the combination of means for distending transverse reinforcing filaments, a carrier having series of relatively movable jaws for taking the filaments from the distending means, an operating element for one of said series of jaws, a sliding cam mounted on the carrier for shifting said element to operate said jaws, and means for imparting sliding movement to said cam.

39. In a machine of the character described, the combination of means for distending transverse reinforcing filaments, a carrier for taking the filaments from the distending means having series of relatively movable jaws for grasping the filaments cutter means adjacent said jaws for severing the filaments from their source of supply, and means for imparting a composite upward and longitudinal movement to said cutter means to produce its severing operation.

In testimony whereof I have signed my name to this specification.

CHARLES H. HOWARD.